US008204983B2

(12) United States Patent
Zalewski

(10) Patent No.: US 8,204,983 B2
(45) Date of Patent: Jun. 19, 2012

(54) ALLOCATION OF ON-LINE MONITORING RESOURCES

(75) Inventor: Gary Zalewski, Oakland, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 870 days.

(21) Appl. No.: 11/929,617

(22) Filed: Oct. 30, 2007

(65) Prior Publication Data

US 2009/0113515 A1 Apr. 30, 2009

(51) Int. Cl.
*G06F 15/173* (2006.01)
(52) U.S. Cl. ............... 709/224; 709/226; 726/22
(58) Field of Classification Search ............ 709/223, 709/224, 226; 726/3, 1, 22; 463/25, 29
See application file for complete search history.

(56) References Cited

U.S. PATENT DOCUMENTS

| 6,243,039 | B1 * | 6/2001 | Elliot ................... 342/457 |
| 6,721,703 | B2 * | 4/2004 | Jackson et al. ............ 704/270 |
| 7,753,795 | B2 * | 7/2010 | Harris et al. .............. 463/42 |
| 2006/0282426 | A1 * | 12/2006 | Spears .................. 707/5 |
| 2007/0218996 | A1 | 9/2007 | Harris et al. |
| 2007/0238524 | A1 | 10/2007 | Harris et al. |
| 2007/0238528 | A1 | 10/2007 | Harris et al. |
| 2007/0276521 | A1 * | 11/2007 | Harris et al. .............. 700/91 |
| 2008/0220854 | A1 * | 9/2008 | Midgley et al. ............ 463/25 |
| 2009/0006371 | A1 * | 1/2009 | Denoue et al. ............ 707/5 |

OTHER PUBLICATIONS

U.S. Appl. No. 11/725,175, entitled "Maintaining Community Integrity", filed Mar. 16, 2007.
U.S. Appl. No. 11/925,570, entitled "Community Based Moderation in On-Line Sessions", filed Oct. 26, 2007.
U.S. Appl. No. 11/932,863, entitled "System and Method for Improving Application Integrity", filed Oct. 31, 2007.
U.S. Appl. No. 11/927,357, entitled "Moderation of Cheating in On-Line Gaming Sessions", filed Oct. 29, 2007.

* cited by examiner

*Primary Examiner* — Ario Etienne
*Assistant Examiner* — El Hadji Sall
(74) *Attorney, Agent, or Firm* — Procopio, Cory, Hargreaves & Savitch LLP

(57) ABSTRACT

Methods, apparatuses, and techniques for adjusting a level of monitoring of the activity of users in an online community are described. Aspects include a triggering mechanism being activated by a community member in response to inappropriate activity by another community member. Receiving a time based history of community members activity around a time of the triggering mechanism being activated. Recreating the community activity from the time based history. Evaluating activities of the community members to determine if there was inappropriate activity and if there is inappropriate activity by an offending community member applying online resources to track the activities of the offending community member.

12 Claims, 19 Drawing Sheets

| Type of Behavior | Possible Actions |
|---|---|
| Behavior Outside Of Community Standards | Warning |
| | Cut Off Voice Messages |
| | Cut off Subscription to Online Activity |
| | Increase Level of Monitoring Offending User |
| | Restrict Access to Portions of Online Activity |
| Game Cheat | Warning |
| | Decrease Player's Abilities |
| | Penalize Player – Decrease Score |
| | Restrict Available Game Options |
| | Cut Off Subscription to Online Activity |
| | Increase Level of Monitoring Offending User |
| Questionable Behavior | Warning |
| | Increase Level of Monitoring Offending User |
| Illegal Activity | Cut Off Subscription to Online Activity |
| | Report to Proper Authorities |
| | Increase Level of Monitoring Offending User |

Figure 13

ALLOCATION OF ON-LINE MONITORING RESOURCES

BACKGROUND

1. Field of the Invention

The present invention relates to allocation of on-line resources, and more specifically, to allocation of on-line resources based on community based moderation of online sessions.

2. Background

In typical on-line session, such as virtual reality sessions, games, and other applications, users may interact and communication with other on-line users in the on-line community. During this interaction, the members of the on-line community may be subjected to inappropriate or offensive behavior from other members of the community.

For example, one community member may begin sending chat messages that include profane or other inappropriate language to the other members of the community. Likewise, one member of the community may make obscene gestures or drawings that are visible to the other community members.

In addition, a community member may engage in illegal activity. For example, in a virtual reality environment one of the community members may post pornography or engage in other illegal activity. The illegal activity would be offensive to other members of the community.

In another example, members of the online community may be engaged in an online game. During the online game one, or more, or the game players may engage in cheating to take an unfair advantage over the other game players. The cheating activity can lead to dissatisfaction with the online game by the other online game players.

Offensive, illegal, cheating, or other inappropriate actions by particular community members can decrease the enjoyment of the on-line session for the other community members. Thus, there is a need for improving moderation in on-line sessions.

SUMMARY

Embodiments of the present invention provide methods, systems, apparatus, and programs for allocating online or other network resources to monitor an online community. In one embodiment, a method of allocating online resources to monitor online community members that have been identified as engaging in inappropriate behavior includes receiving an indication that an online user may be engaging in inappropriate behavior. Capturing a time based history of an online session that includes the user's behavior. Recreating the online activity and determining if there was inappropriate activity by an offending online user.

Allocating online resources for a desired level of monitoring of the offending online user. In one embodiment, the time based history of the online session includes capturing online session activity that occurred a predetermined amount of time before receiving the indication that an online user may be engaging in inappropriate behavior. In another embodiment, capturing the time based history includes associating online user identities with their online activity. In one embodiment, allocating online resources for a desired level of monitoring of the offending online user includes assigning online resources to track the activities of the offending online user. Another embodiment includes a network resource allocation entity that captures the time based history. In one embodiment, a moderation entity captures the time based history, recreates the online activity, and communicates the desired level of monitoring of the offending user to a network resource allocation entity that allocates network resources.

In another embodiment, a method of allocating online resources to monitor online community members that have been identified as engaging in inappropriate behavior includes receiving an indication of a triggering mechanism being activated by an online community member in response to suspected inappropriate activity by another online community member. Receiving a time based history of community members online activity around a time of the triggering mechanism being activated. Recreating the community activity from the time based history. Evaluating activities of the community members to determine if there was inappropriate activity and if there is inappropriate activity by an offending community member allocating online resources to monitor community members that have been identified as engaging in inappropriate behavior.

In another embodiment, an online community with online resources that are allocated to monitor members of the online community include at least two users that communicate in the online community, wherein a first user in the online community observes suspected inappropriate behavior by one or more other users in the online community, the first user presses a panic button in response to the inappropriate behavior, the pressing of the panic button initiating storing a time based history of online community activity, the time based history covering a period that extends a desired duration before the pressing of the panic button and a desired duration after pressing the panic button. A moderation entity that receives the time based history and recreates the online activity to determine if there was inappropriate activity by one of the users, and if there was inappropriate activity by one of the users, determining a desired level of monitoring to track an offending users' activity. A network allocation resource allocation entity that allocates online resources to track the activities of the offending user.

In one embodiment, a network entity includes a network interface that receives an indication that an online user may be engaged in inappropriate activity. A processor that captures a time based history of online activity of users in an online community when the indication is received, recreates the online activity of the online community and determines if there has been inappropriate online activity by one or more of the online users and if there is inappropriate activity allocates online resources to achieve a desired level of monitoring of an offending users.

In an embodiment, the time based history of the online session includes online session activity that occurred a predetermined amount of time before the triggering mechanism is pressed. The duration of the time based history can be set by the user, or it can be a predetermined period, or by a network entity, or by other techniques. The time based history can include information that associates online user identities with their online activity. In an embodiment, a reward can be issued to a user that observes inappropriate behavior and presses the triggering mechanism. An example of a triggering mechanism is a panic button.

Other features and advantages of the present invention will become more readily apparent to those of ordinary skill in the art after reviewing the following detailed description and accompanying drawings.

BRIEF DESCRIPTION OF THE DRAWINGS

FIG. 13 is a table illustrating examples of different types of actions that can be taken in response to a user's inappropriate behavior.

DETAILED DESCRIPTION

After reading the following description it will be apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Figure 1:
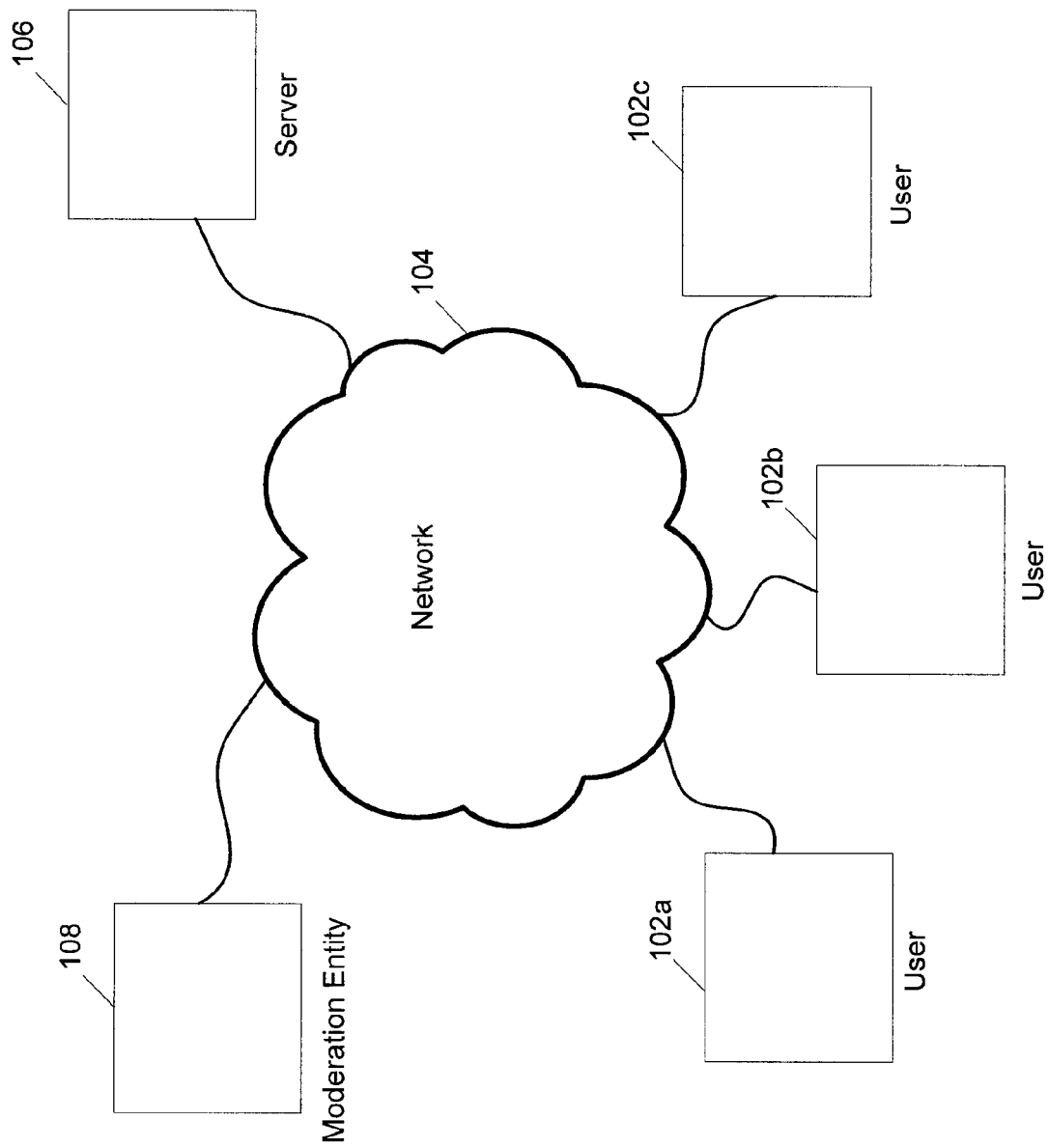
FIG. 1 is a block diagram illustrating an exemplary architecture for moderating online user activity.

FIG. 1 is a block diagram illustrating an exemplary architecture for moderating online user activity. As shown on FIG. 1, one or more users or clients 102a-c are in communication with a network 104. In one embodiment the users 102a-c communicate via the network with each other in an ad hoc communication network. In another embodiment the users communicate via the network with a server 106. The users 102 may use a network enabled device, such as game console such as a Sony play station 3, a laptop computing device, a portable game device such as a play station portable, a desktop computing device, a cellular telephone, or any other device capable of interfacing to the communication network 104.

In one embodiment the architecture includes a moderation entity 108 which is also in communication with the network 104. The moderation entity 108 can be used to take appropriate action if the one of the users 102a-c is engaged in inappropriate or unacceptable behavior. For example, as discussed further below, the moderation entity 108 may interrupt communications from one user to another or may restrict an offending user's access to the network for a desired period of time.

In one embodiment the moderation entity 108 is a separate network node. In other embodiments the moderation entity 108 may be incorporated within another network node, such as one or more of the users 102a-c or the server 106 or other network entity. It should be understood that reference to a user 102a-c and a server 106 and moderation entity 108 are merely for convenience of understanding various embodiments. For example, embodiments of the present invention may be implemented in the context of a peer-to-peer network, a client server network, or within a peer group. Therefore, in some instances a client or user may function as a server or moderation entity and vice versa, depending on the timing and the nature of the data exchange. For example, various clients in a peer-to-peer network may each comprise a portion of an online activity such as a virtual reality and may send and receive data related to the online activity. Thus, any reference to a user or a server or a moderation entity is meant to be inclusive of operations performed by one or any of the operating entities unless specified otherwise by specific limitations. In some instances a device with user/server functionality may be referred to in a generic moniker such as network node, computing node or network device. In that regard user, server and moderation entity may each be considered network computing nodes or a network device.

In one example embodiment, one user 102c may monitor the activity of other online users 102a and 102b as they interact in the online environment. When one of the users 102c believes one of the other users 102a and 102b is engaged in inappropriate conduct for the online environment, they can, for example, press a panic button or some other indication that inappropriate activity is taking place. Although this discussion describes one user 102c monitoring other users 102a-b, in other embodiments all users are monitoring the activities of all other users. In other embodiments selected users or groups of users can be authorized to monitor other online users.

When the panic button is pressed, a snapshot of the online environment is captured and sent to the moderation entity 108 for evaluation. The snapshot of the online activity includes the activity that was occurring when the panic button was pressed as well as a desired period of time prior to the panic button being pressed. In other words, each user device 102 that is monitoring online activity includes a buffer or other type of memory where a duration of all of the users activity that is being monitored in the online environment is being stored. In this way when the panic button is pressed, the contents of the buffer which includes a period of time prior to the pressing of the panic button as well as a desired period of time following the pressing of the panic button is sent to the moderation entity 108 for evaluation. The duration of the time based history can be set by the user, or it can be a predetermined period, or by a network entity, or by other techniques.

The moderation entity receives the stored online activity of the users. The moderation entity 108 then evaluates the online activity against a set of norms or rules that have been pre-established. If the moderation entity 108 determines that one of the users' behavior is inappropriate, the moderation entity 108 can take appropriate action. For example, if a user is using offensive language the moderation entity 108 could disable that user's microphone. In another example, the moderation entity 108 could warn the user to stop using the offensive language or the moderation entity 108 could restrict the user and only allow the user to access portions of the online environment where the language is acceptable, such as an adult only portion of the environment, or the users could be restricted from the online environment entirely. In anther example, if a user is cheating in a game, the moderation entity 108 could warn the user to stop the cheating activity or the moderation entity 108 could restrict the user and not allow the cheating user to participate in the game.

In one embodiment, users that identify inappropriate behavior can be reworded. For example, if a user identifies a cheater in a game, the user can be give a reward. Rewards encourage user to identify inappropriate behavior, such as cheating, and because appropriate action is taken the online experience for all of the other users is improved. Of course users can abuse the reward feature by identifying others that are not involved in inappropriate behavior. To discourage these types of false identification a user can receive demerits for making fake identifications.

Figure 2:
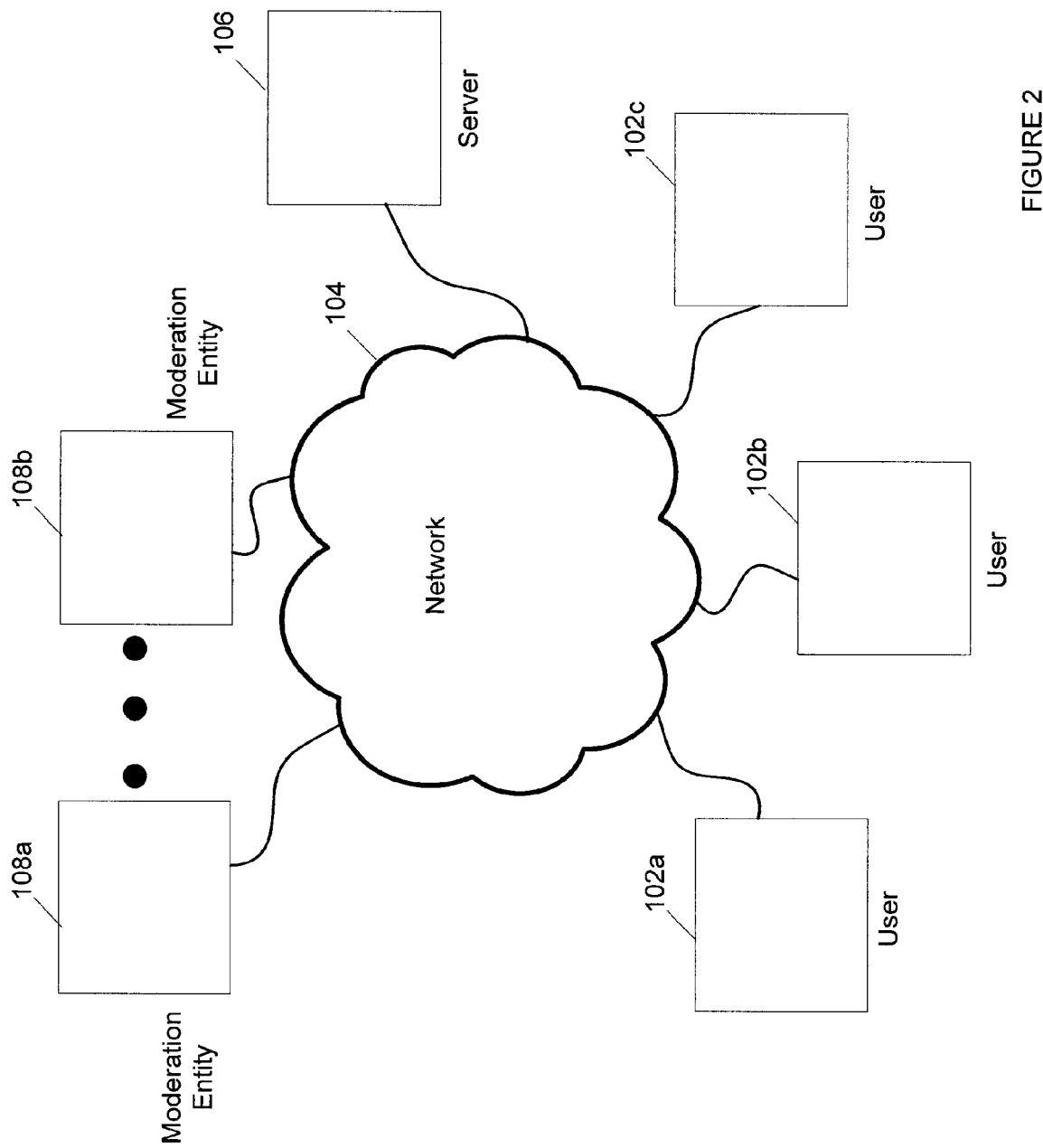
FIG. 2 is a block diagram of another embodiment of a network architecture for moderating online user activity.

FIG. 2 is a block diagram of another embodiment of a network architecture for moderating online user activity. As shown in FIG. 2, multiple users 102a, 102b, and 102c are in communication with a network 104. Also in communication with the network is a server 106. In the embodiment of FIG. 2 there are multiple moderation entities 108a through 108n. In this embodiment each moderation entity is configured to evaluate a specific type of inappropriate behavior. For example, one moderation entity could be configured to evaluate offensive language in the online environment. A different moderation entity can be configured to evaluate cheating activity in an online game. Still another moderation entity can be configured to evaluate online illegal activity such as distribution of pornographic or other illegal materials. In other embodiments, other moderation entities are configured to evaluate other types of inappropriate online behavior. Similar to the communication network of FIG. 1, once the inappropriate online activity has been determined by the moderation entity, appropriate action can be taken.

Figure 3A:
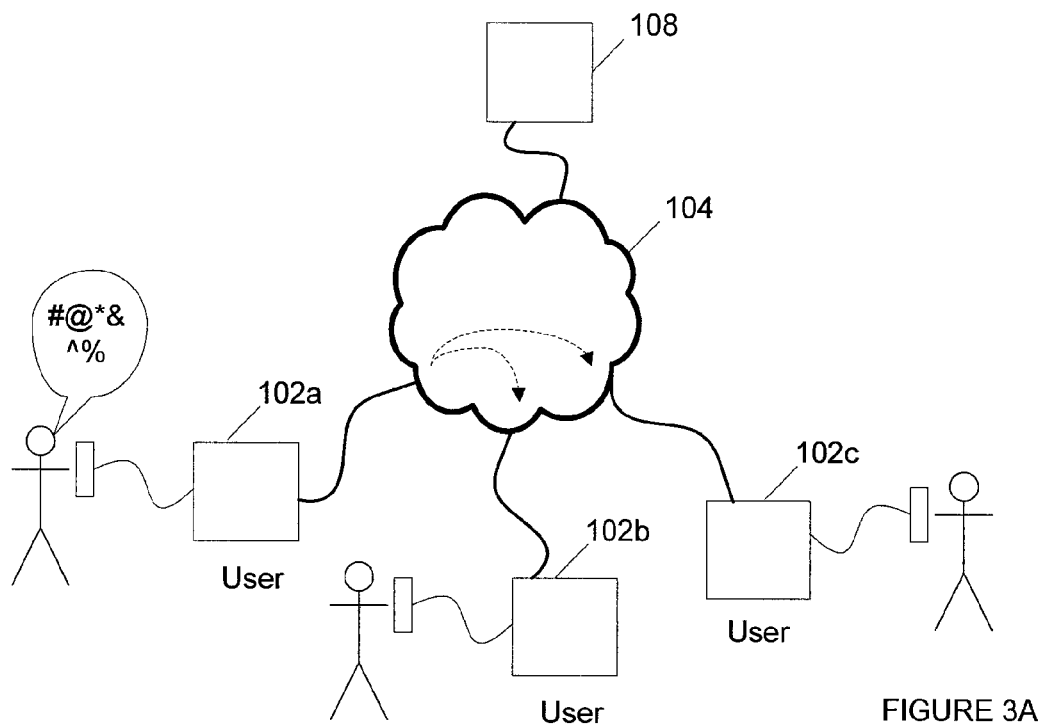
FIG. 3A is a block diagram of a peer-to-peer communication network illustrating aspects of community moderation.

FIG. 3A is a block diagram of a peer-to-peer communication network illustrating aspects of community moderation. As show in FIG. 3A, the community includes three users 102a, 102b and 102c in communication with each other through the communication network 104. Also in communication with the network 104 is the moderation entity 108. In the example shown in FIG. 3A, the first user 102a is communicating by sending voice messages to the other users 102b and 102c. In the example of FIG. 3A the voice message sent by the first user 102a includes inappropriate or profane language.

Figure 3B:
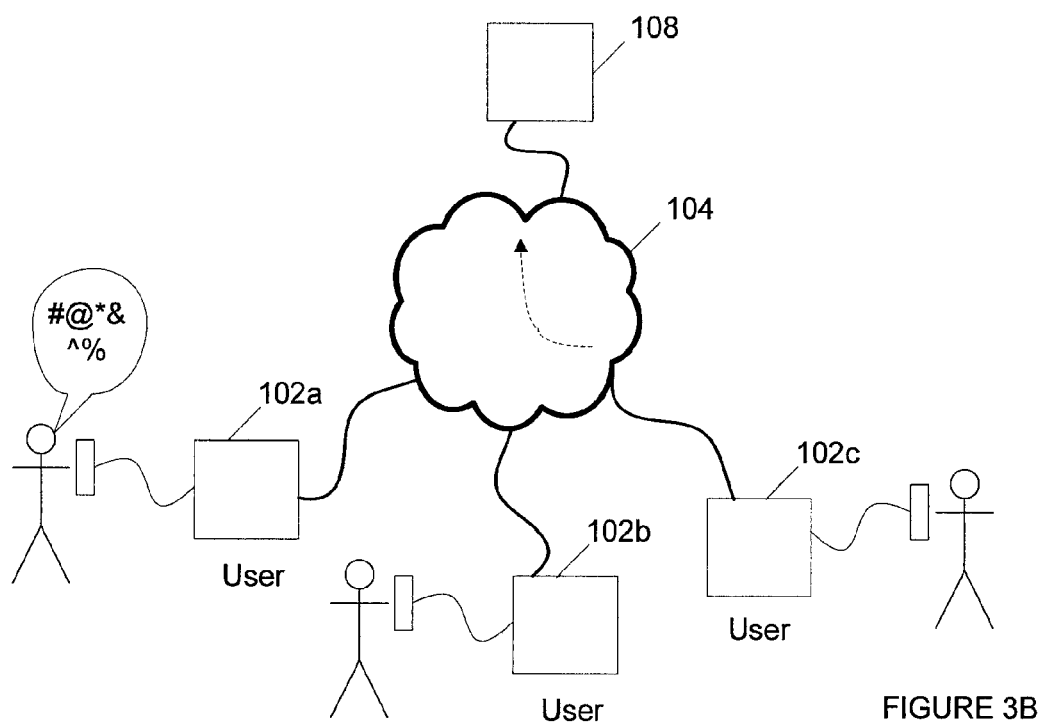
FIG. 3B is a block diagram illustrating an indicating that there is inappropriate behavior by another user in the network of FIG. 3A.

FIG. 3B is a block diagram illustrating a indicating that there is inappropriate behavior by another user in the network of FIG. 3A. In one embodiment, the user 102c presses a panic button to indicate there is inappropriate behavior. As shown in FIG. 3B, the third user 102c upon hearing the inappropriate and profane message from the first user 102a presses a panic button or other triggering device to indicate inappropriate behavior is, or has, occurred. While engaged in the online activity, the users network enabled devices have been buffering a time segment, or time based history, of online activity thereby recording the online activity of all of the monitored users in the community. In other words, a buffer in the third user's device 102c has a sliding window of memory that is always recording a portion of previous online activity by the users. When the panic button is pressed, that previous activity on the network is saved as well as the present and future activity for a desire duration. This entire buffer can then be sent to the moderation entity 108. In addition to sending the recorded online activity, a message sent to the moderation entity 108 can include an indication of the type of offensive or inappropriate behavior that the third user 102c is reporting. Examples of the type of online activity that can be buffered include a time-based history of online activity such as text chat, audio chat, the state of the characters and/or online participants as well as other types of online activity.

In another embodiment the sights and sounds of Avatars that are engaged in an online game can be captured and stored in the time-based history. The moderation entity 108 can then evaluate the time-based history of the online activity of the users and determine if the first user's 102a behavior is inappropriate such as if the first user is cheating.

Figure 3C:
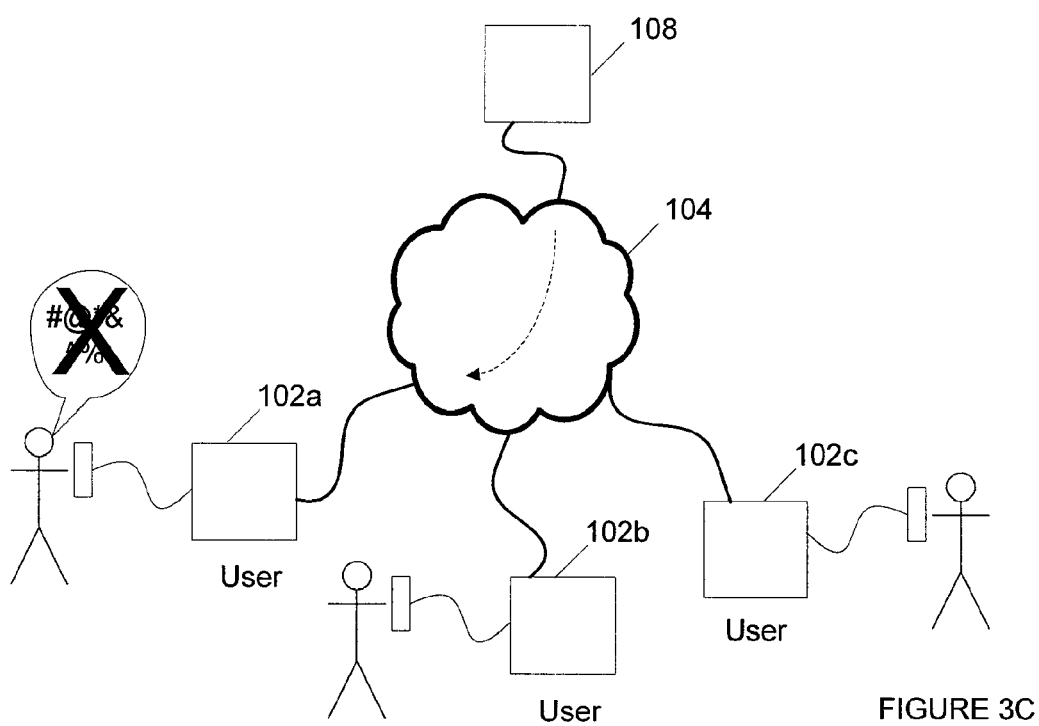
FIG. 3C is a block diagram of the peer-to-peer network of FIG. 3A showing the moderation entity 108 taking preventive action.

FIG. 3C is a block diagram of the peer-to-peer network of FIG. 3A showing the moderation entity 108 taking preventive action. As shown in the example of FIG. 3C, upon determining that the first user's 102a activity is inappropriate, the moderation entity 108 can take preventive action. For example, the moderation entity 108 can send a warning to the first user 102a indicating that their behavior is inappropriate and to not engage in such behavior in the future. Other types of preventive action can also be taken. For example, the moderation entity 108 can send a command to the first user's 102a device and disable the first user's 102a communication capability such as disabling the first user's microphone.

In other embodiments the moderation entity 108 could take actions such as cutting off the offending user's subscription so that they can no longer engage in the online activity. The moderation entity 108 could also add or increase monitoring of a particular user who has been engaged in inappropriate activity. In other embodiments these types of corrective actions can be used individually or in any combination.

While the examples illustrated in FIGS. 3A-C show three users, in other embodiments there may be different number of users. Also, different numbers, and groups of users may monitor and be monitored in other embodiments.

Figure 4A:
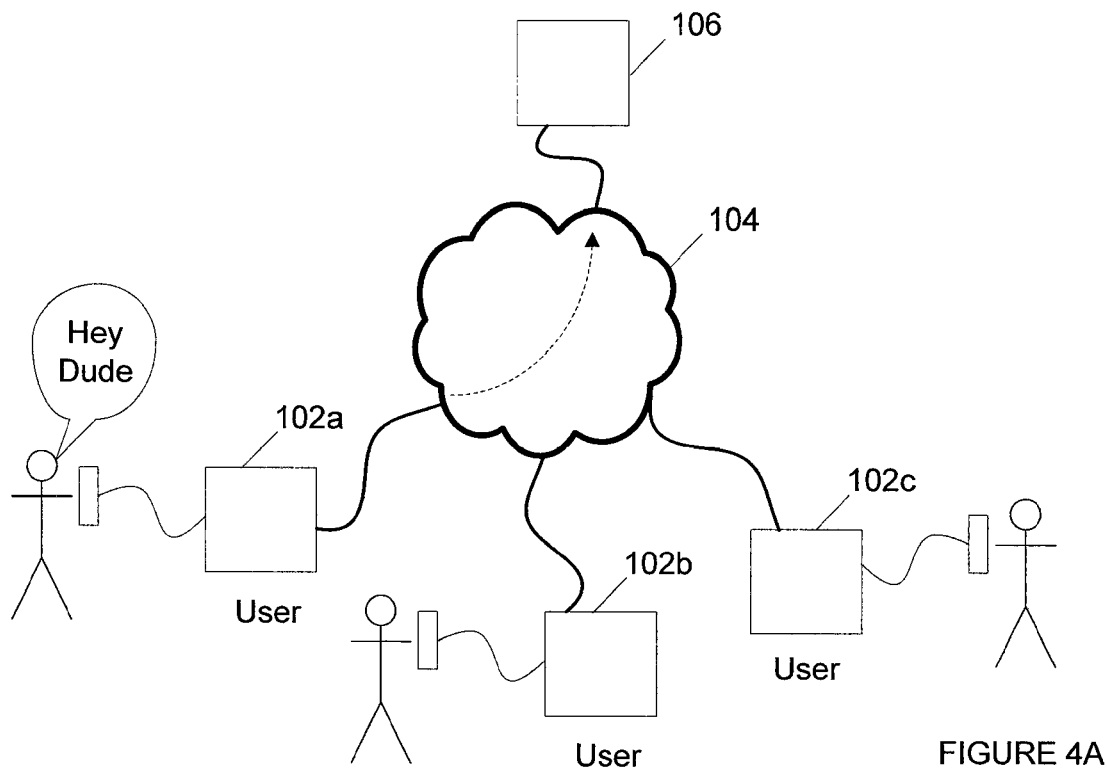
FIG. 4A is a block diagram of a client server communication network illustrating aspects of community moderation.

FIG. 4A is a block diagram of a client server communication network illustrating aspects of community moderation. As shown in FIG. 4A, three users 102a, 102b and 102c use network enabled devices to communicate through a server 106 while engaged in an online activity. In FIG. 4A the first user 102a is engaged in an audio chat session with a second and third users, 102b and 102c. The audio message from 102a is routed to the server 106.

Figure 4B:
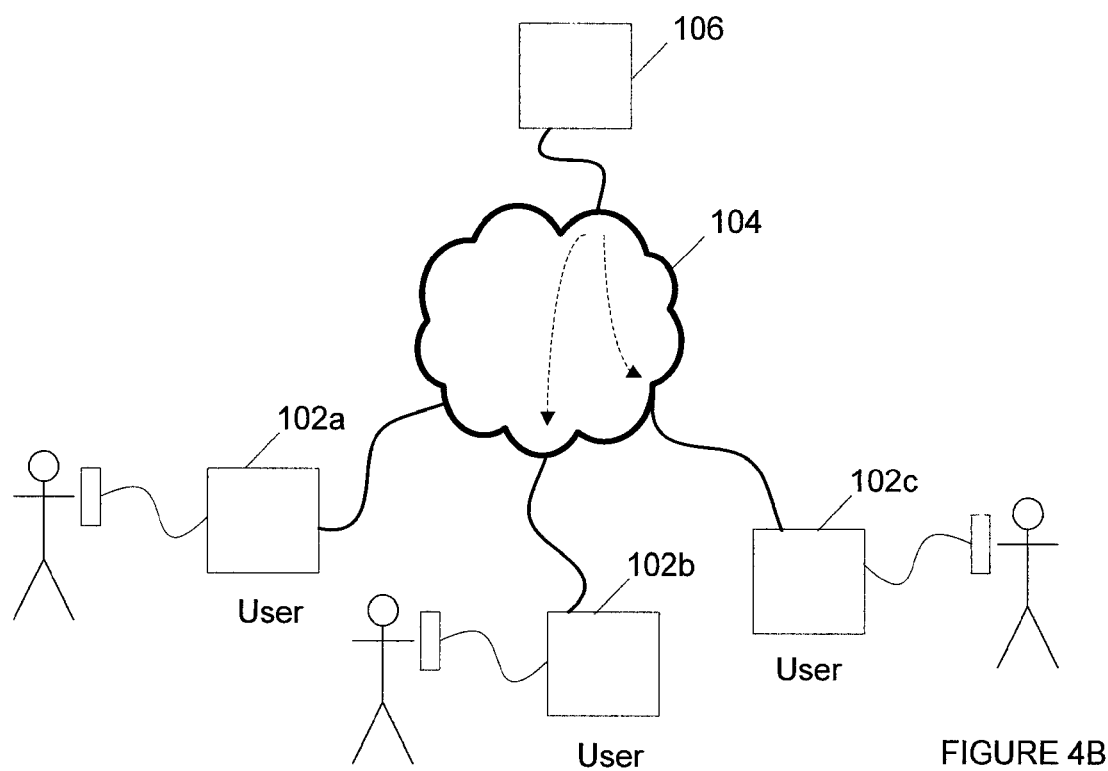
FIG. 4B illustrates the network of FIG. 4A where the server transmits the audio chat message from the first user to other users.

FIG. 4B illustrates the network of FIG. 4A where the server transmits the audio chat message from the first user to other users. In the example of FIG. 4B, the server 106 transmits the audio chat message from the first user 102a to the second and third users, 102b and 102c. In other embodiments, there can be an number of other users in the network. For example, the first user's message can be transmitted to one other user or to any number of other users.

Figure 4C:
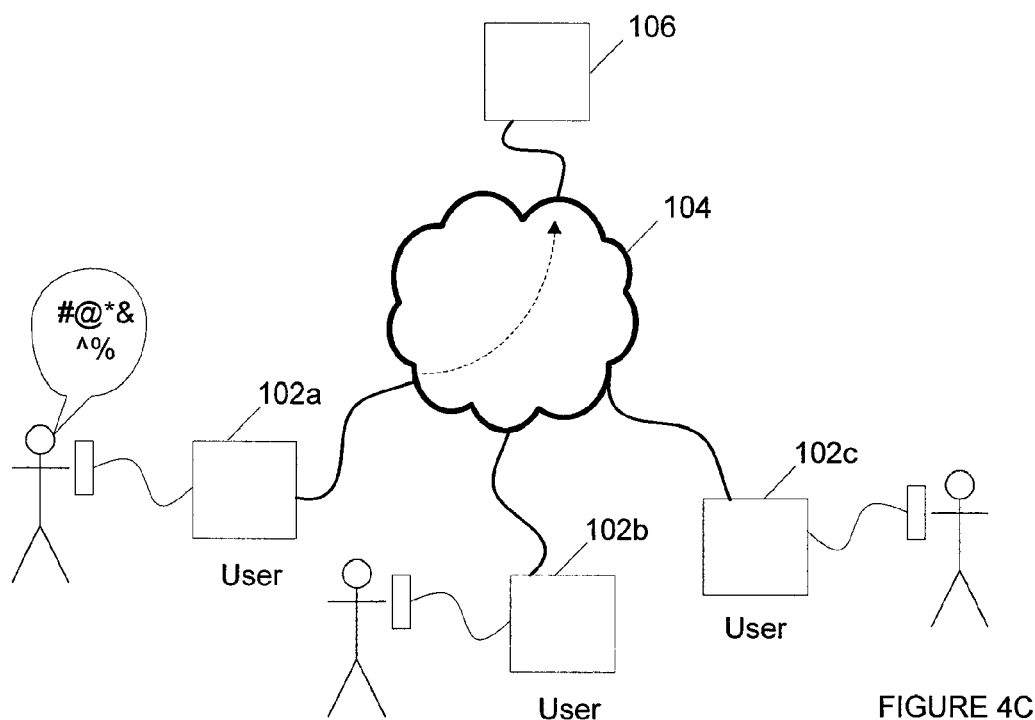
FIG. 4C illustrates the network of FIG. 4A where a user sends an inappropriate message.

FIG. 4C illustrates the network of FIG. 4A where a user sends an inappropriate message. In this example, the first user 102a sends an audio chat message intended for the second and third users, 102b and 102c, and the message includes inappropriate content.

Figure 4D:
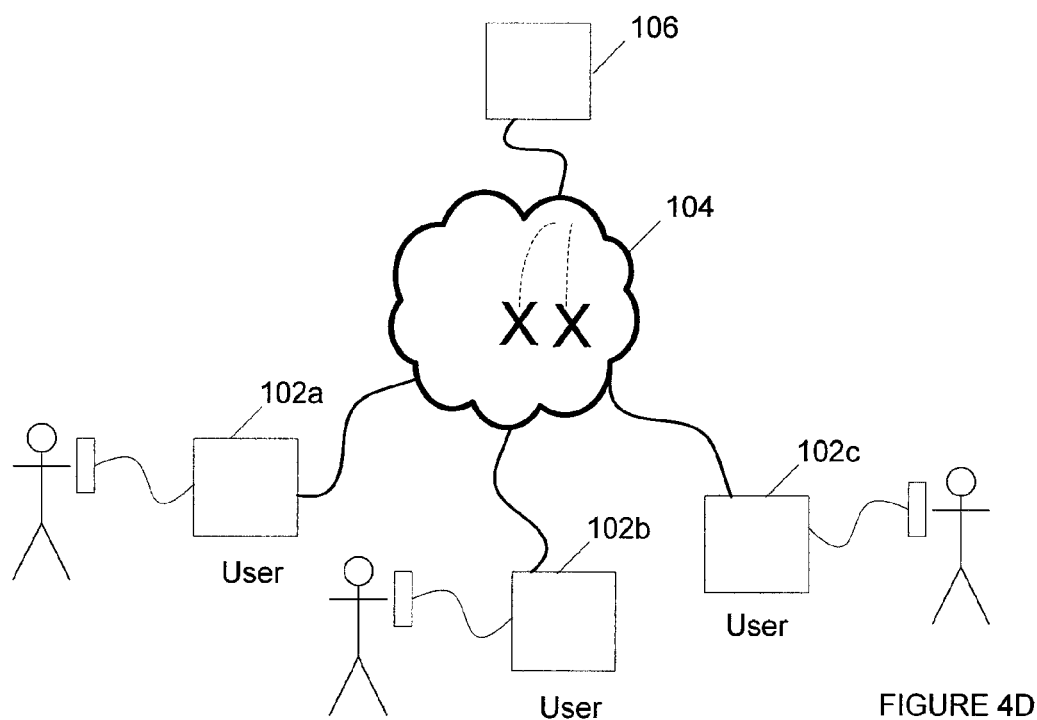
FIG. 4D illustrates the network of FIG. 4A showing the server taking appropriate action for the inappropriate message sent by a user.

FIG. 4D illustrates the network of FIG. 4A showing the server taking appropriate action for the inappropriate message sent by a user. As shown in FIG. 4D, the server 106 detects that the audio message sent by the first user 102a and determines that it is inappropriate. Because the message includes inappropriate material the server 106 does not transmit it to the second and third users, 102b and 102c. The server 106 can also take other actions such as warning the first user 102a that his audio message and behavior is inappropriate, cutting off the subscription of the first user, as well as additional or increased monitoring of the first user, and other types of actions.

In the embodiments illustrated in FIG. 4A to 4D functionality of the moderation entity has been incorporated into the server 106. In other embodiments the functionality of the moderation entity can be incorporated into other network entities, for example, a user device, or other network device.

While the examples illustrated in FIGS. 4A-D show three users, in other embodiments there may be different number of users. Also, different numbers, and groups of users may monitor and be monitored in other embodiments.

Figure 5:
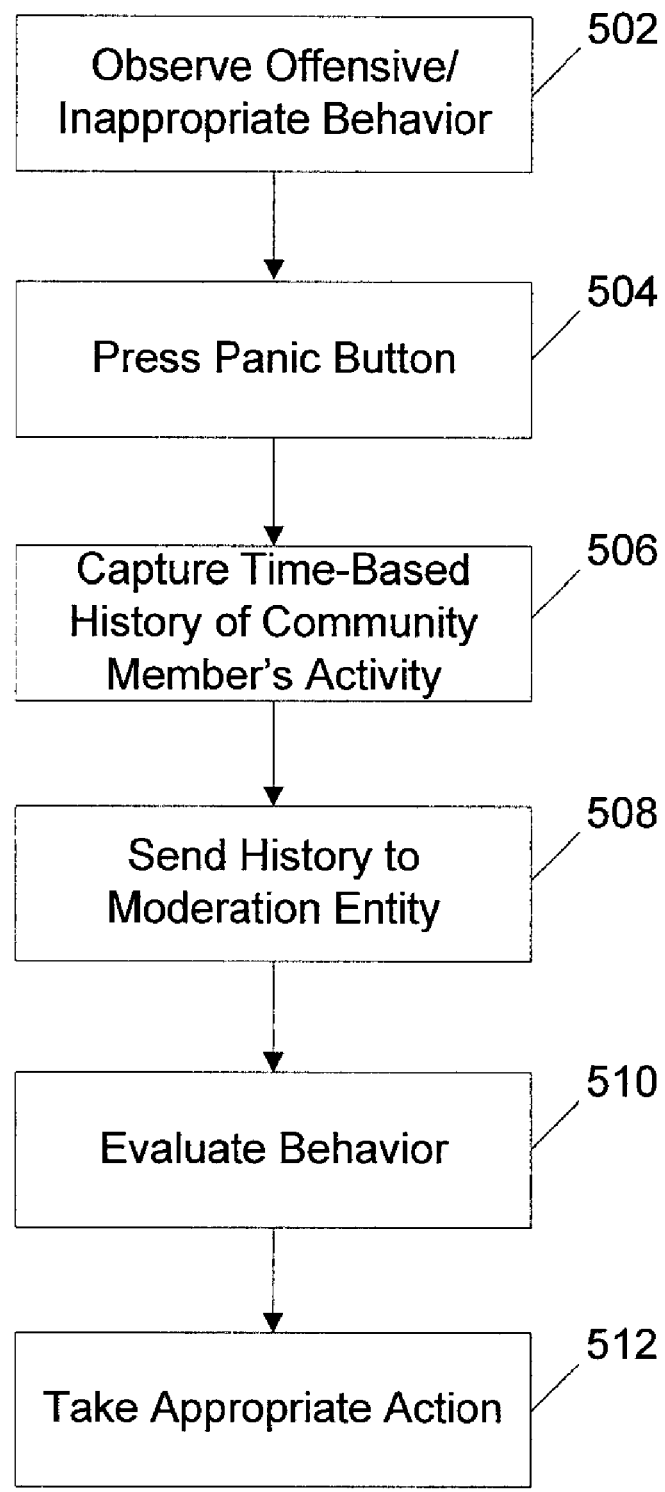
FIG. 5 is a flowchart illustrating a method of detecting and preventing inappropriate online activity.

FIG. 5 is a flowchart illustrating a method of detecting and preventing inappropriate online activity. Flow begins in block 502 where an online user observes offensive or inappropriate behavior. The types of behavior that are considered offensive or inappropriate can be based on an individual user's perception of inappropriate behavior, or based on community norms of what is appropriate and inappropriate behavior. Various techniques for establishing what is appropriate and inappropriate behavior are disclosed in U.S. patent application Ser. No. 11/502,265 filed Aug. 9, 2006, and entitled "Dynamic Rating of Content" which is incorporated herein by reference in its entirety.

Flow continues to block 504 where a user presses the panic button or performs another action to indicate or response to observing the offensive or inappropriate online behavior. Flow then continues to block 506 where a time-based history of all the community members' activity is captured. The time-based history can be stored in a user's device and includes a sliding window of online activity. In other words, a portion of the past online activity is continually recorded in a buffer such that when the panic button is pressed, the previous online activity is stored as well as the present and a portion of a future period of online activity. In this way evidence indicating a user's inappropriate or offensive online activity is captured in the time-based history.

Flow continues to block 508. In block 508 the time-based history is sent to a moderation entity. In addition to the time-based history, an optional indication of the type of offensive behavior can also be sent to the moderation entity. For example, an indication can be sent showing that the user believes the inappropriate activity is offensive language or illegal activity such as online pornography or a player cheating in a game or other inappropriate activity.

Flow then continues to block 510. In block 510 the moderation entity evaluates the time-based history to determine if the activity is offensive or inappropriate. Optionally, if an indication of the type of offensive behavior was included in the message sent to the moderation entity, the time-based history could be routed to a particular engine within the moderation entity or to an appropriate moderation entity based upon the types of activity. In other words, one moderation entity, or engine within a moderation entity, can be optimized to identify and take appropriate action for a particular type of inappropriate activity, for example, profane language. A different engine or moderation entity can be optimized to detect and take action for other types of inappropriate activity, for example, illegal online activity or game cheats or the like.

Flow then continues to block 512 where the moderation entity takes appropriate action. During evaluation if the moderation entity determines that the activity is not inappropriate that may take no action. If the moderation entity determines that the behavior is offensive or inappropriate then the moderation entity can take appropriate action. For example, the moderation entity could warn the user about his behavior or it could cut off the user's subscription or increase or add monitoring to track the online activities of the offending user.

Optionally, if it is determined that there has been inappropriate activity then the user reporting the activity may receive an award. If it is determined that there is no inappropriate activity then the user reporting the activity may receive demerits. In this way users are encouraged to report inappropriate activity while discouraged from making false reports.

Figure 6:
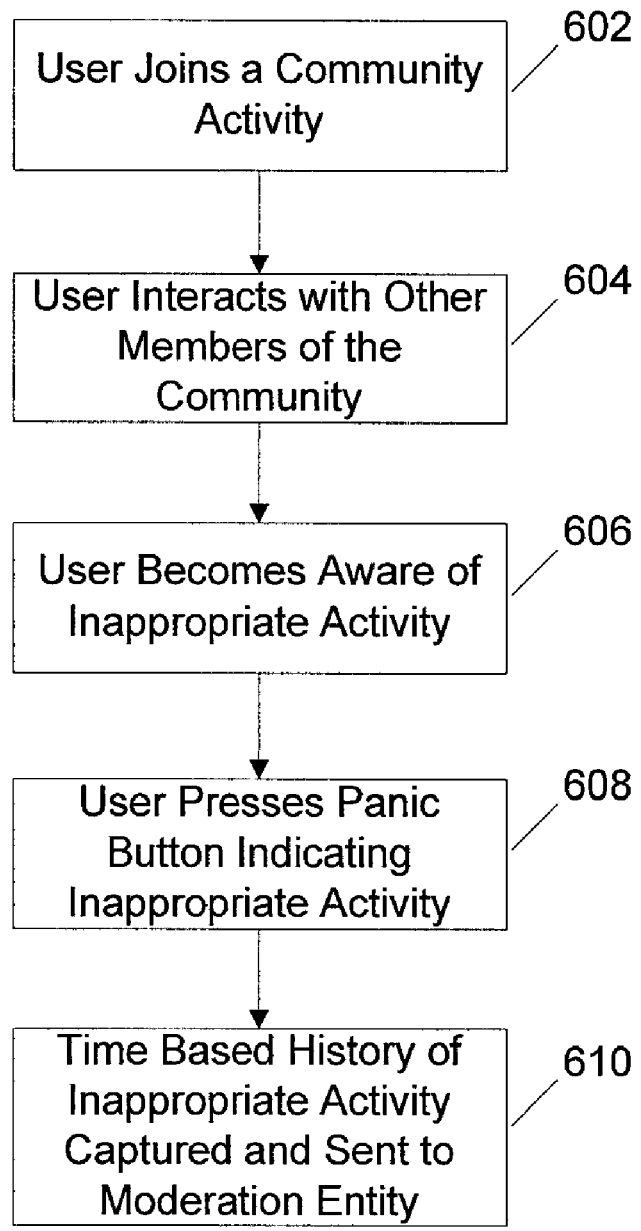
FIG. 6 is a flowchart of another embodiment of detecting inappropriate online behavior.

FIG. 6 is a flowchart of another embodiment of detecting inappropriate online behavior. Flow begins in block 602 where a user joins an online community activity. For example, a user could join an online game activity or they could engage in online virtual reality sessions or other online activities, for example, such as Sony Home® environment. Flow continues to block 604 where the user interacts with other members of the online community. Flow then continues to block 606 where the user becomes aware of inappropriate activity of one of the other community members. Flow then continues to block 608 where the user presses a panic button or otherwise indicates that inappropriate activity has been observed. Flow then continues to block 610 where a time-based history of inappropriate activity of the online environment is captured and sent to a moderation entity. As noted previously, the time-based history includes a sliding window that records activity prior to the pushing of the panic button as well as after the pushing of the panic button. In this way the online activity when the offensive behavior occurred is captured and sent to the moderation entity. Optionally users reporting inappropriate activity can receive rewards while users making false reports can receive demerits.

Figure 7:
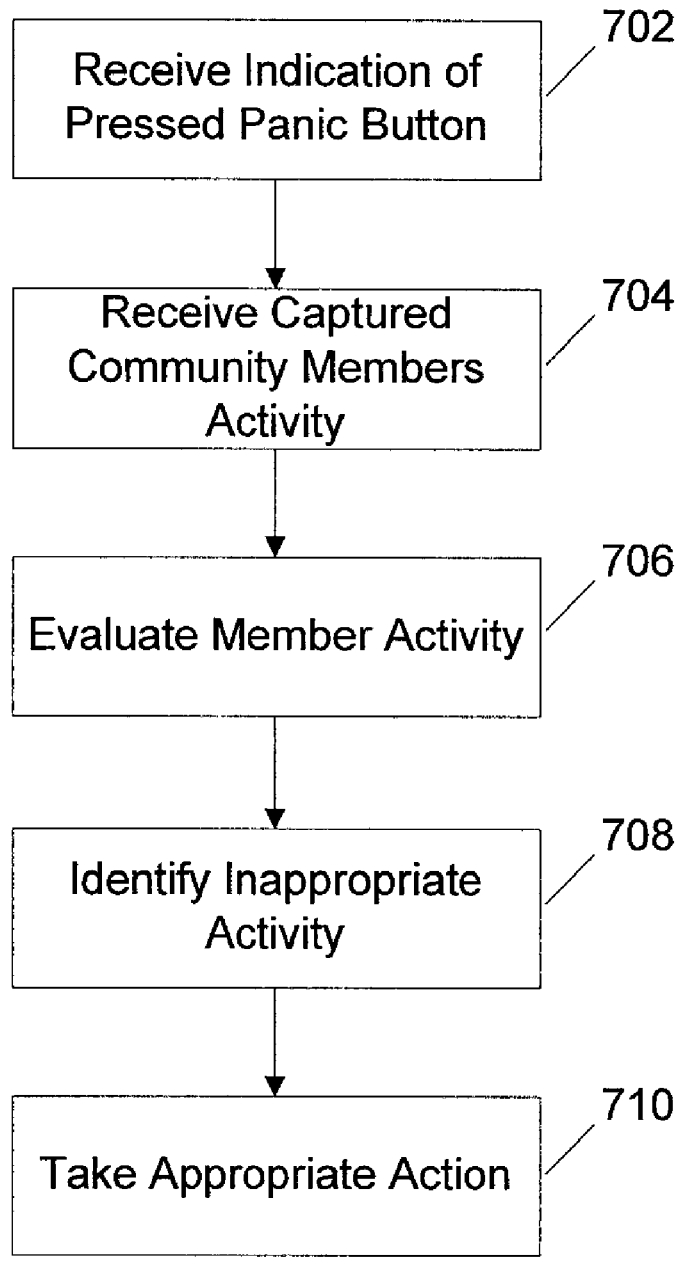
FIG. 7 is a flowchart illustrating aspects of taking appropriate action in response to inappropriate activity.

FIG. 7 is a flowchart illustrating aspects of taking appropriate action in response to inappropriate activity. In one embodiment, the action may be taken by a network entity such as a moderation entity 108 or server 106 in FIGS. 1 and 2. Flow begins in block 702 where an indication of the occurrence of inappropriate activity, such as the pressing of a panic button, is received. Flow then continues to block 704 where a time-based history of the online community members' activity is received. Flow then continues to block 706. In block 706 the online community members' activity is evaluated. In block 708 any inappropriate activity recorded in the time-based history of the online community is identified. Flow then continues to block 710 where appropriate action is taken. If in block 708 there was no inappropriate activity identified, then in block 710 no action is taken. If in block 708 inappropriate was identified, then in block 710 an appropriate action is taken. For example, a warning could be issued to the offending user or the offending user could have his subscription cut off or there could additional or increased monitoring of the offending user. Optionally users reporting inappropriate activity can receive rewards while users making false reports can receive demerits.

Figure 8:
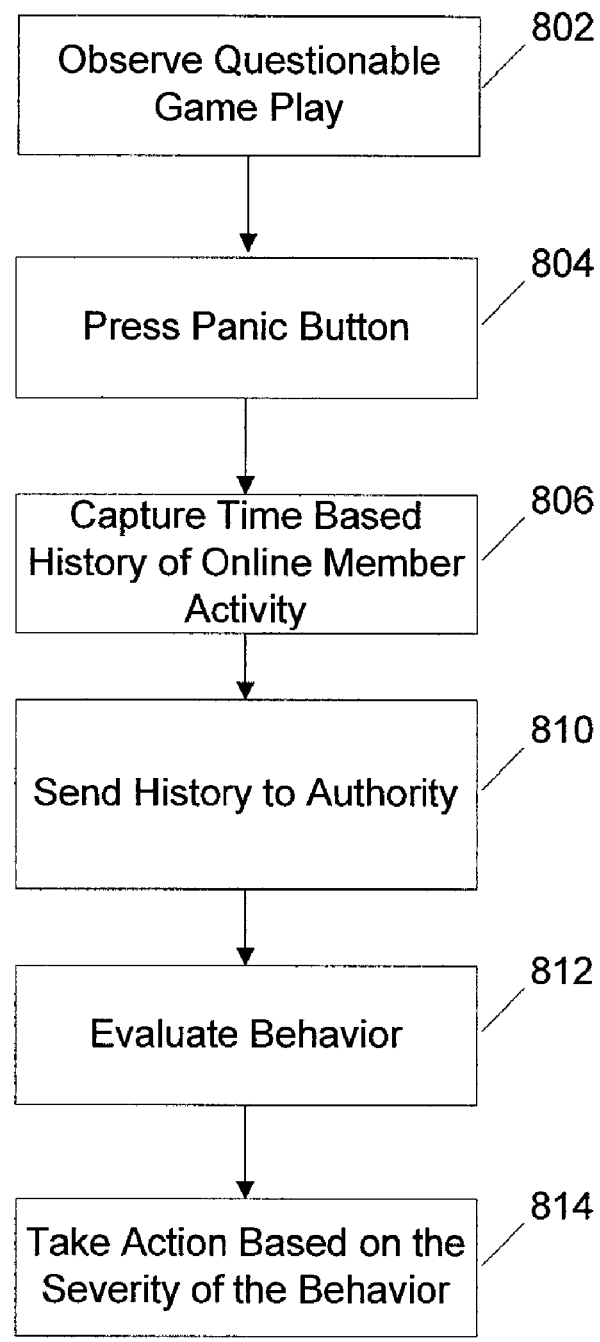
FIG. 8 is a flow diagram illustrating an embodiment of using community moderation to prevent cheating in an online video game.

FIG. 8 is a flow diagram illustrating an embodiment of using community moderation to prevent cheating in an online video game. In one embodiment, preventing cheating in an online video game may be accomplished by a network entity such as a moderation entity 108 or server 106 in FIGS. 1 and 2. Flow begins in block 802 where an online game user observes questionable game play of one of the other participants. Flow continues to block 804 where the user observing the questionable play indicates that they believe another player may be cheating by, for example, presses the panic button or a triggering mechanism, or other type of indication. Flow then continues to block 806 where a time-based history of the online game members' activity is captured. The time-based history includes a duration of game play that has been stored prior to the pressing of the panic button as well as a period of game play following the pressing of the panic button. In this way a sliding window of time surrounding the pressing of the panic button has been recorded. Types of activity that can be included in the time-based history include text chat, audio chat, the state of all characters, their positions, and any other data that will be useful in recreating the online environment. Flow then continues to block 810. In block 810 the history is sent to a moderation entity. In one embodiment an optional indication of the type of inappropriate behavior observed is also included. For example, if a player has observed the suspected cheating player of disappearing, or having exceptional strength, or being resistant to attacks from other players, that information can be included and sent along with the time-based history.

Flow then continues to block 812. In block 812 the moderation entity evaluates the online behavior of the game participants. Using the time-based history, the moderation entity can play back the scenario leading up to the pressing of the panic button. In this way it can be determined whether or not someone was cheating. Various techniques for detecting cheating in an online game are described in pending U.S. patent application Ser. No. 11/386,039 entitled "Active Validation of Network Devices" filed Mar. 20, 2006, Ser. No. 11/415,881 entitled "Passive Validation of Network Devices" filed May 1, 2006, Ser. No. 11/449,141 entitled "Game Metrics" filed on Jun. 7, 2006, and Ser. No. 11/725,175 entitled "Maintaining Community Integrity" filed Mar. 16, 2007, all of which are incorporated herein in their entirety.

Following evaluation of the online behavior in block 812, flow continues to block 814. In block 814 the moderation entity can take appropriate action based on the severity of the inappropriate behavior. In one embodiment if no inappropriate behavior is detected, then the moderation entity will take no action. In other embodiments if inappropriate behavior is detected, then the moderation entity can take any of a range of appropriate actions including warning, cutting of a user's subscription, adding increased monitoring, or any combination of the above. Optionally a user reporting cheating can receive rewards while a user making false reports can receive demerits.

While FIGS. 3 through 7 describe embodiments associated with inappropriate online activity such as offensive language, the same techniques can be applied to prevent cheating in online gaming. For example, in FIGS. 3A-C instead of a user detecting offensive language and reporting to the moderation entity, a user could detect suspected cheating in an online game environment and report that to the moderation entity where appropriate action will be taken. Likewise in FIGS. 4A-D in a server/client-based architecture, the server could detect suspected online cheating by a user and take appropriate action. Likewise in FIGS. 5 to 7, the offensive or inappropriate behavior could be cheating in an online game environment.

Figure 9:
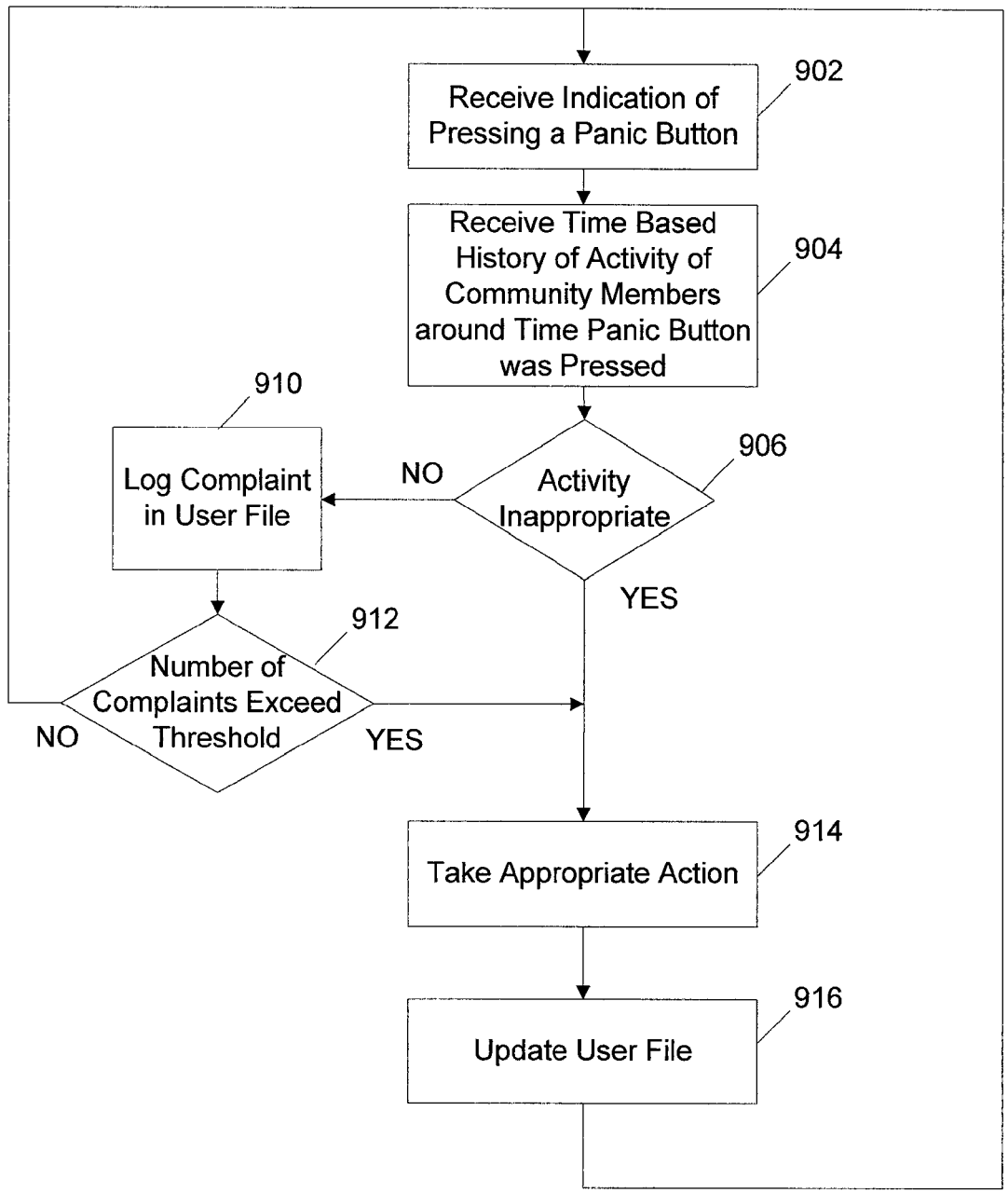
FIG. 9 is a flow diagram illustrating aspect of moderating online behavior.

FIG. 9 is a flow diagram illustrating aspect of moderating online behavior. In one embodiment, the aspects of FIG. 9 can be implemented by a moderation entity or a server as illustrated in FIGS. 1 and 2. Flow begins in block 902 where an indication that inappropriate behavior has been observed, such as that a panic button has been pressed, is received. Flow continues to block 904 where a time-based history of activity of community members around the time the panic button was pressed is received. Then, in block 906, community members activity is evaluated to determine if it is inappropriate activity. Inappropriate activity could include profane or inappropriate language, distribution of, or showing of, pornography to other online users, cheating in an online game, and the like. If in block 906 it is determined that the activity is not inappropriate, flow continues to block 910. In block 910 the complaint against the user is logged in a user's file. This user file may be maintained to keep track of the number of indications of other users' believing there was inappropriate activity being performed by the suspect user.

Flow then continues to block 912. In block 912 the number of complaints is compared against a predetermined value or threshold. If it is determined that the number of complaints against this user do not exceed the threshold level, flow continues back to block 902 and the system waits for the next pressing of a panic button. Returning to block 912, if it is determined that the number of complaints exceeds the threshold, then flow continues to block 914. Because the number of complaints has exceeded the threshold, it is believed that there may be some inappropriate behavior or at least, some type of behavior that is offensive to the other members of the community being practiced by the suspect user. As such, in block 914 appropriate action can be taken. This action could be merely to warn or inform the suspect user that the other members of the community find their behavior unacceptable or the action could be more severe such as cutting off subscription. In addition, there may be increased monitoring of the user because the other members of the community find his behavior offensive. Returning to block 906, if it is determined that the user's activity is inappropriate, then flow continues to block 914 and appropriate action is taken. Again, this action can range from warning the user that his activity is inappropriate to cutting off subscription to adding increased monitoring and the like.

Flow then continues to block 916. In block 916 the user's file is updated indicating there is inappropriate activity or that there has been an action taken. For example, the user file may indicate that a warning has been issued to this user about his activity. When a later action is taken in 916 against the same user, it may increase the severity of the action in response to the previous action taken.

As shown in FIG. 9, if a number of users press the panic button indicating a particular type of activity is unacceptable to other members of the community, even though the standards that the moderation entity currently uses to evaluate inappropriate behavior indicated the behavior is not inappropriate, the number of complaints logged for a particular type of behavior can be used to modify the standards and rules set used by the moderation entity in evaluating behavior. For example, if a particular type of behavior is not originally considered inappropriate, but the majority of other online users find a particular activity to be inappropriate, as indicated by a large number of complaints for that activity, the moderation entity can modify the standards that it evaluates activity against and set this new activity as being inappropriate. In this way, as the community changes and evolves over time, the standards by which activity is considered inappropriate will evolve with the community.

Figure 10:
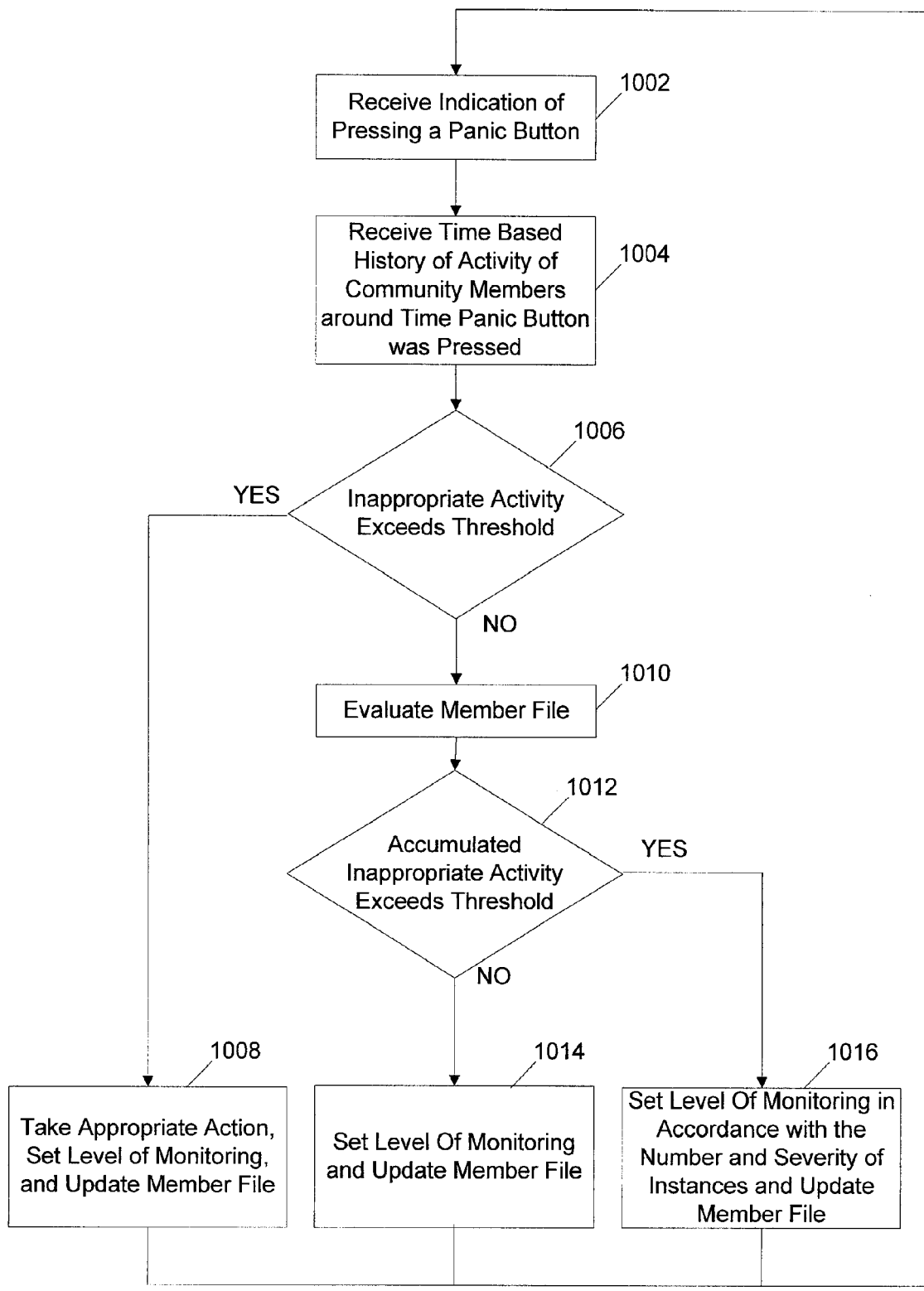
FIG. 10 is a flow diagram of another embodiment of evaluating user online activity.

FIG. 10 is a flow diagram of another embodiment of evaluating user online activity. In one embodiment, the aspects of FIG. 10 can be implemented by a moderation entity or a server as illustrated in FIGS. 1 and 2. Flow begins in block 1002 where an indication that inappropriate activity has taken place, such as that a panic button has been pressed is received. Flow continues to block 1004 and a time-based history of activity of the community members around the time the panic button was pressed is received. This time-based history can include data used to recreate the online activity around the time the panic button was pressed so that a moderator can evaluate if the online activity of a particular user is inappropriate or not.

Flow continues to block 1006 and the time-based history is evaluated to see if there is inappropriate activity. If the inappropriate activity exceeds a threshold, flow continues to block 1008. In block 1006 the threshold could be set such that the first time a particular inappropriate activity is done an appropriate action is taken. For example, if there is an illegal activity such as pornography or some other illegal behavior, flow will continue to block 1008 where appropriate action is immediately taken due to the severity of the activity. In addition to taking appropriate action, a level of monitoring of a particular user may be adjusted. For example, the level of monitoring could be increased such that this particular offending user's activity online is monitored at all times by the moderation entity. The user's file is also updated to indicate his inappropriate activity Adjusting the level of monitoring allows a system with limited resources to more effectively allocate those resources across the community members. For example, if there is a large community with many members, the moderation entity may not be able to monitor all of the members online activity. By increasing the level of monitoring of particular, identified, individuals that have been identified as engaging in inappropriate behavior, limited system resources can be applied more effectively.

Flow then continues to block 1002 and the online activity continues to be monitored. Returning to block 1006, if the inappropriate activity does not exceed a threshold, then flow continues to block 1010. In block 1010 the member's file is evaluated to see if there have been previous complaints against this particular member. Flow continues to block 1012 and the accumulated inappropriate activity is evaluated to see if it exceeds a threshold. If the accumulated inappropriate activity by this particular member does not exceed the threshold, flow continues to block 1014.

In block 1014 the level of monitoring of this user can be adjusted. For example, the level of monitoring can be increased to more closely monitor the particular member's activities. In addition, the member's file is updated to indicate that there is possible inappropriate behavior. Flow then continues to block 1002 and monitoring if there is an indication of inappropriate activity such as pressing a panic button continues. Returning to block 1012, if the accumulated inappropriate activity exceeds the threshold, then flow continues to block 1016 and the level of monitoring of this particular user will be adjusted in accordance with the number and severity of instances that have been accumulated. For example, the level of monitoring could be increased due to the number of instances that other members have complained about this particular user's activity. The member's file is also updated and flow continues to block 1002 where monitoring of network activity continues.

Figure 11:
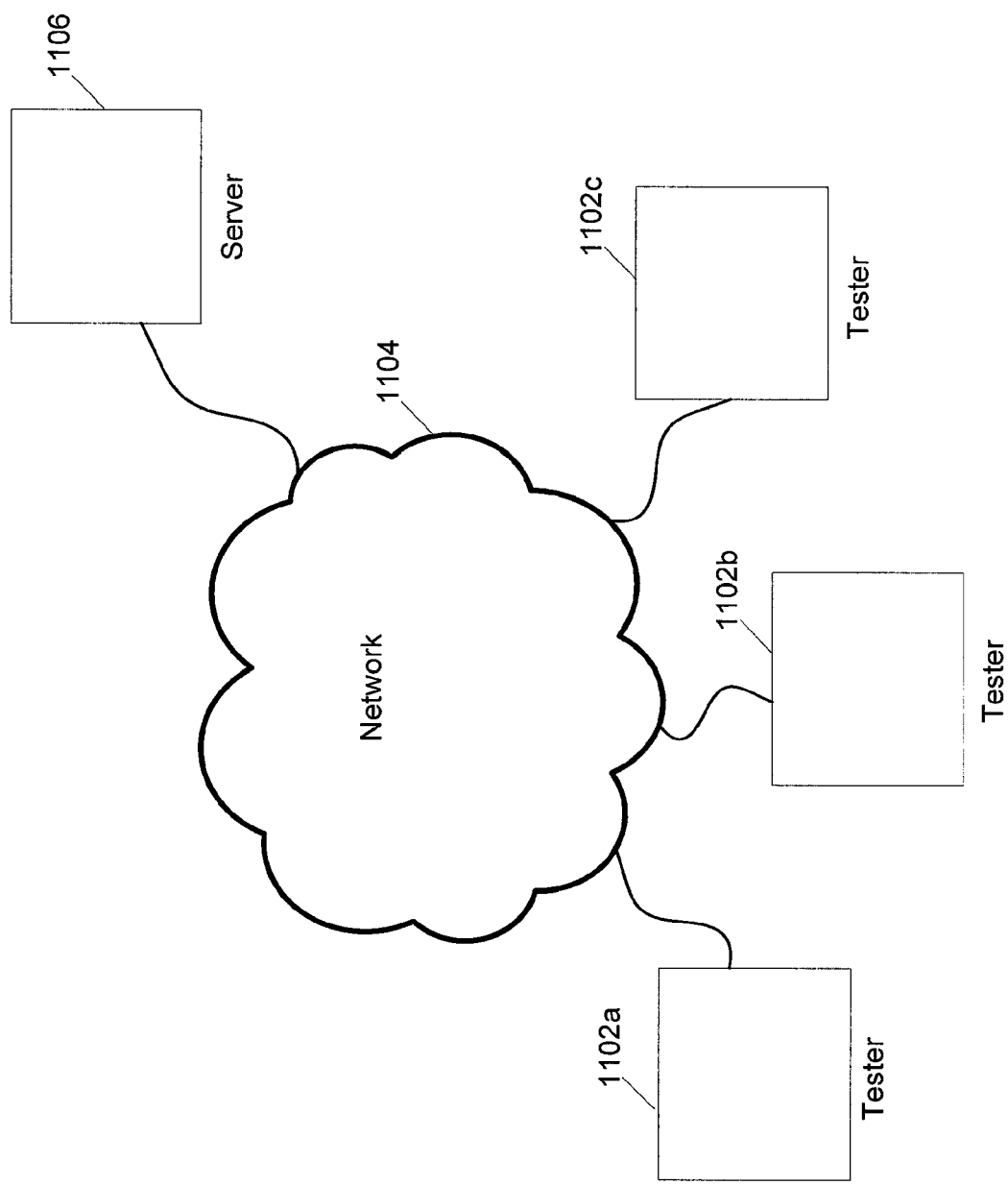
FIG. 11 is a block diagram of a test environment.
Figure 12:
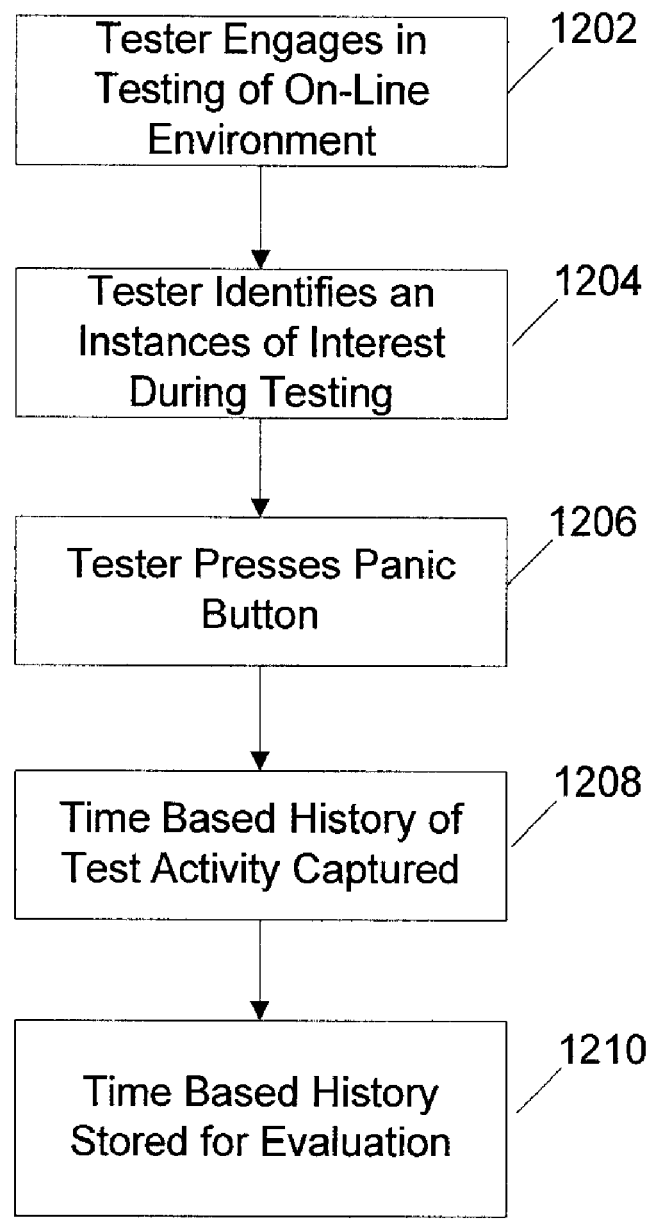
FIG. 12 is a flow diagram of an online test environment as illustrated in FIG. 12.

FIG. 11 is a block diagram of a test environment. For example, FIG. 11 can be a test environment for testing of an online game or other online application. As shown in FIG. 12, there are multiple testers 1102A, 1102B and 1102C. In other embodiment, there may be any desired number of testers, for example, one, two, or any number of testers. These online testers communicate with a network 1104 and a server 1106. As the testers interact and evaluate the online activity, they will find bugs or glitches which they wish to report to the server, for trouble shooting and updating the application. When one of the testers comes across a glitch, he can trigger an indicate such as pressing a panic button which will record the online environment for a duration around the time the panic button was pressed. For example, the duration of time can extend from before the button was pressed until after the button was pressed for a desired period of time. In this way the online environment can be captured for evaluation as to the cause of the glitch.

FIG. 12 is a flow diagram of an online test environment as illustrated in FIG. 12. Flow begins in block 1202 where testers engage in testing of an online environment or application. Flow continues to block 1204 where a tester identifies an instance of interest during testing. For example, they may identify a glitch or some discontinuity in the application which they wish to report. Flow continues to block 1206 where the tester presses the panic button at the time of the point of interest. Flow then continues to block 1208 where a time-based history of the online environment during the testing activity is captured. In one embodiment, the time-based history is a sliding window of memory beginning before the pressing of the panic button through and after pressing of the panic button. Flow then continues to block 1210 where the time-based history is stored for evaluation and trouble shooting of the application.

FIG. 13 is a table indicating examples of possible actions that can be take against a user as a result of a user's inappropriate behavior. The table shown in FIG. 13 has a first column 1302 listing different types of inappropriate behavior and a second column 1304 listing different possible actions that can be taken for each type of behavior. For example, a first type of inappropriate behavior 1306 is behavior that falls outside of predetermined community standards. Examples of this type of behavior can be use of profane language, racial or ethnic slurs, types of gestures, and other types of behaviors that the community has identified as unacceptable. Examples of possible actions 1308 that can be take in response to these types of behaviors include issuing a warning, cutting off voice messaging capability; cutting off a user's subscription to the online activity, increasing the monitoring of an offending user, restricting access to portions of the online activity such as restricting access to portions of the online environment where children tend to visit, and the like.

A second type of inappropriate behavior 1310 listed in FIG. 13 is cheating in an online game. Examples of possible actions 1312 that can be take in response to cheating in an online game include issuing a warning, decreasing a players abilities in the game, penalizing the player such as decreasing their score, restricting a players access to game options such as not letting a player use particular game options, cutting off a player's subscription to the online game, increasing the monitoring of the cheater, and the like.

A third type of behavior 1314 listed in FIG. 13 is questionable behavior. This type of behavior includes behavior that may not violate community standards, but many of the members of the community may complain about the behavior. Examples of this type of behavior may include derogatory language, or suspicious, or distrustful, behavior. Examples of possible actions 1316 that can be take in response to questionable behavior include issuing a warning, increasing the monitoring of the user, and the like.

A fourth type of inappropriate behavior 1318 listed in FIG. 13 is illegal activity. An example of this type of activity can be displaying pornography to children online. Examples of possible actions 1320 that can be take in response to illegal activity online can include cutting off a player's subscription to the online game, reporting the activity to proper authorities, increasing the monitoring of the cheater, and the like.

Figure 14:
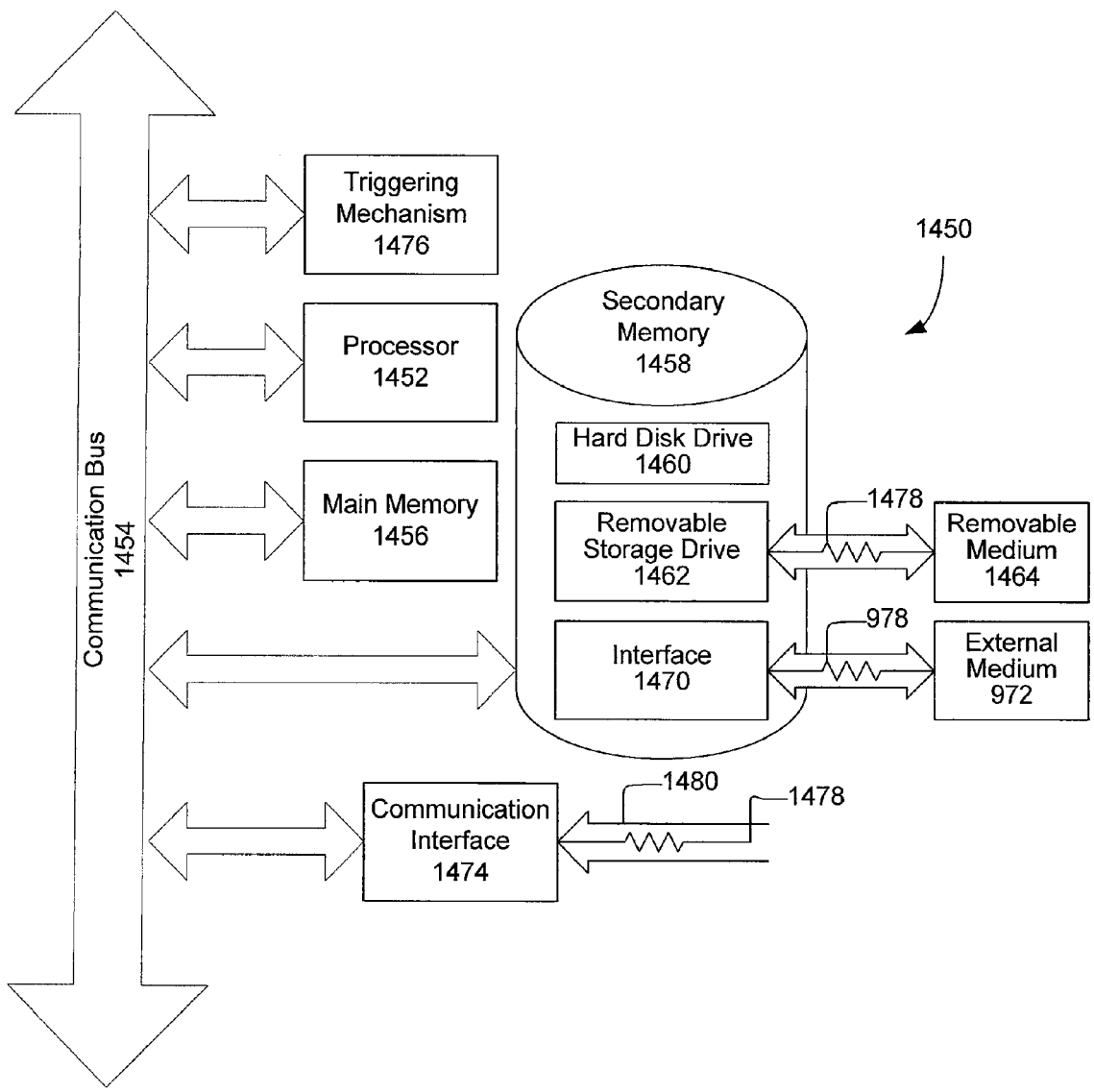
FIG. 14 is a block diagram illustrating an example network enabled device 1450 that may be used in connection with various embodiments described herein.

FIG. 14 is a block diagram illustrating an example network enabled device 1450 that may be used in connection with various embodiments described herein. The network enabled device 650 may include one or more processors, such as processor 1452. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor, for example if parallel processing is to be implemented. Such auxiliary processors or coprocessors may be discrete processors or may be integrated with the processor 1452.

The processor 1452 may be connected to a communication bus 1454. The communication bus 1454 may include a data channel for facilitating information transfer between storage and other peripheral components of the computer system 1450. The communication bus 1454 further may provide a set of signals used for communication with the processor 1452, including a data bus, address bus, and control bus (not shown). The communication bus 1454 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The network enabled device 1450 may also include a main memory 1456 and may also include a secondary memory 1458. The main memory 148 can provide a buffer to store online activity during an online session. For example, the buffer can provide a sliding window of memory that stores online activity of users activity in the online session. The duration of the online session that is saved can be predetermined, set u a user, adjusted under program control, or by other techniques. The main memory 1456 can also provide storage of instructions and data for programs executing on the processor 1452. The main memory 1456 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1458 may optionally include a hard disk drive 1460 and/or a removable storage drive 1462, for example a floppy disk drive, a magnetic tape drive, a compact disc ("CD") drive, a digital versatile disc ("DVD") drive, a memory stick, etc. The removable storage drive 1462 reads from and/or writes to a removable storage medium 1464 in a well-known manner. Removable storage medium 1464 may be, for example, a CD, DVD, a flash drive, a memory stick, etc.

The removable storage medium 1464 is typically a computer readable medium having stored thereon computer executable code (i.e., software) and/or data. The computer software or data stored on the removable storage medium 1464 may be read into the computer system 1450 as electrical communication signals 1478.

In alternative embodiments, secondary memory 1458 may include other similar means for allowing computer programs or other data or instructions to be loaded into the computer system 1450. Such means may include, for example, an external storage medium 1472 and an interface 1470. Examples of external storage medium 1472 may include an external hard disk drive or an external optical drive, or and external magneto-optical drive.

Other examples of secondary memory 1458 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 1472 and interfaces 1470, which allow software and data to be transferred from the removable storage unit 1472 to the network enabled device 1450.

The network enabled device 1450 may also include a communication interface 1474. The communication interface 1474 allows software and data to be transferred between the network enabled device 450 and external devices, networks, or information sources. For example, computer software or executable code may be transferred to network enabled device 1450 from a network entity via communication interface 1474. In addition, the communication interface 1474 can establish and maintain communications, both wired and wireless, to external networks, such as the Internet. Examples of communication interface 1474 include a modem, a network interface card ("NIC"), a communications port, a PCMCIA slot and card, an infrared interface, and an IEEE 1394 firewire, a wireless LAN, an IEEE 802.11 interface, an IEEE 802.16 interface, a Blue Tooth interface, a mesh network interface, just to name a few.

Communication interface 1474 typically can implement industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 1474 are generally in the form of electrical communication signals 1478. These signals 1478 may be provided to communication interface 1474 via a communication channel 1480. The communication channel 1480 carries the signals 1478 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) can be stored in the main memory 1456 and/or the secondary memory 1458. Computer programs can also be received via the communication interface 1474 and stored in the main memory 1456 and/or the secondary memory 1458. Such computer programs, when executed, can enable the computer system 1450 to perform the various functions of the present invention as previously described.

In this description, the term "computer readable medium" is used to refer to any media used to store data and/or provide computer executable code (e.g., software and computer programs) to the network enabled device 1450. Examples of these media include main memory 1456, secondary memory 1458 (including hard disk drive 1460, removable storage medium 1464, and external storage medium 1472), and any peripheral device communicatively coupled with communication interface 1474 (including other network devices). These computer readable mediums are means for providing executable code, programming instructions, and software, or storing and/or recording data to the network enabled device 1450.

The network enabled device 1450 also includes a triggering mechanism 1476. The triggering mechanism can be activated by a user to indicate the occurrence of an event. For example, if a user observes inappropriate behavior by another online user the triggering mechanism can be activated. Activation of the triggering mechanism can cause various operations by the network enabled device. For example, if a user activates the triggering mechanism a time-based history of an online session can be stored. In one embodiment, the triggering mechanism is a panic button.

Figure 15:
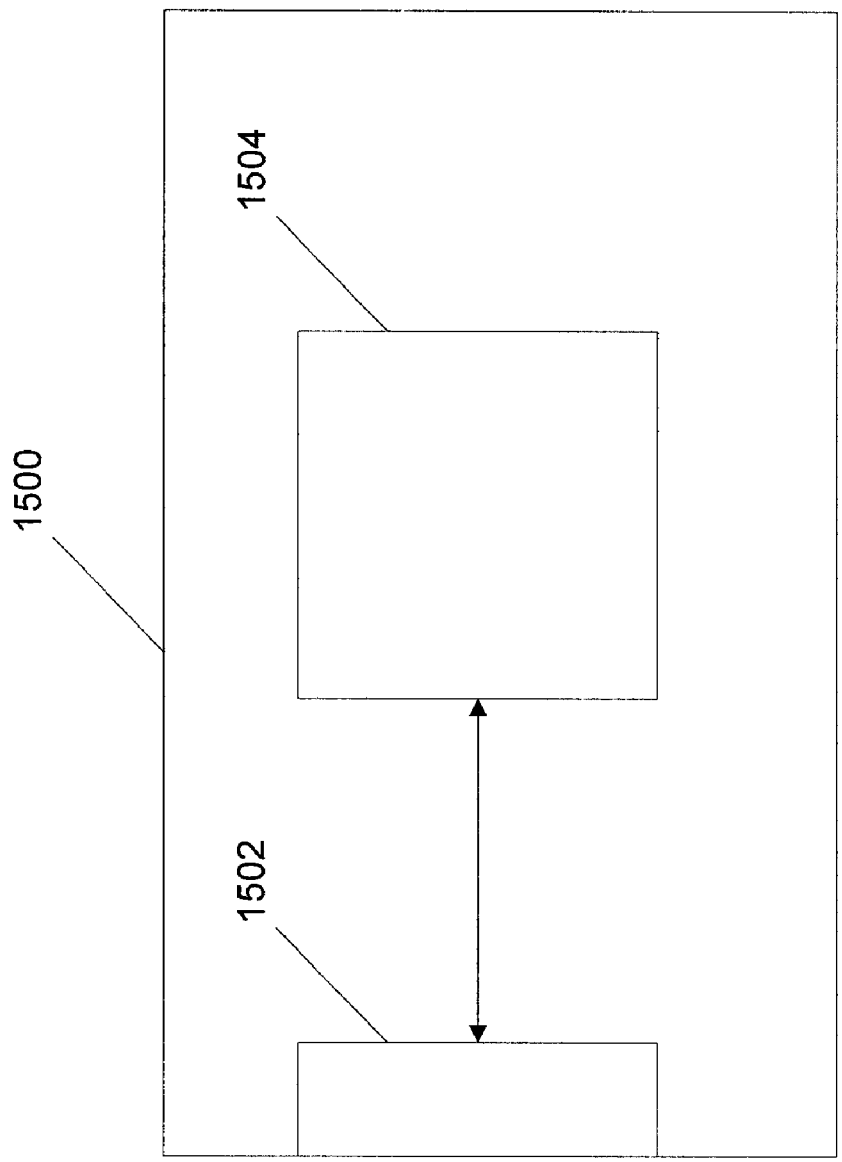
FIG. 15 is a block diagram of an embodiment of a moderation entity that can allocate resources of a network.

FIG. 15 is a block diagram of another embodiment of a moderation entity that can allocate resources such as online resources or other network resources. The moderation entity, also referred to as a network allocation moderation entity, can be a separate entity in communication with a network, such as the network 104 illustrated in FIGS. 1-4, or the operations of the network resource allocation moderation entity can be implemented in another network entity, such as for example, a moderation entity 108, a server 106, a user 102, or other network entity, as shown in FIG. 1. As shown in FIG. 15 the network entity 1500 includes a network interface 1502. The network entity 1500 can receive an indication that an online user may be engaged in inappropriate activity.

The network entity 1500 also includes a processor that can capture a time based history of online activity of users in an online community when the indication is received. The network entity recreates the online activity of the online community and determines if there has been inappropriate online activity by one or more of the online users and if there is inappropriate activity allocates online resources to achieve a desired level of monitoring of an offending users.

In another embodiment, the functions of the network entity 1500 can be implemented in other entities, or across several network entities. For example, a moderation entity 108, or a server 106, or a user 102 can implement the operations of the network entity 1500. For example, a moderation entity can receive an indication of inappropriate activity and capture a time based history of the activity. The moderation entity can then send an indication of a desired level of monitoring that is desired to a network entity that adjust a level of network resources allocated to monitoring the offending user.

Figure 16:
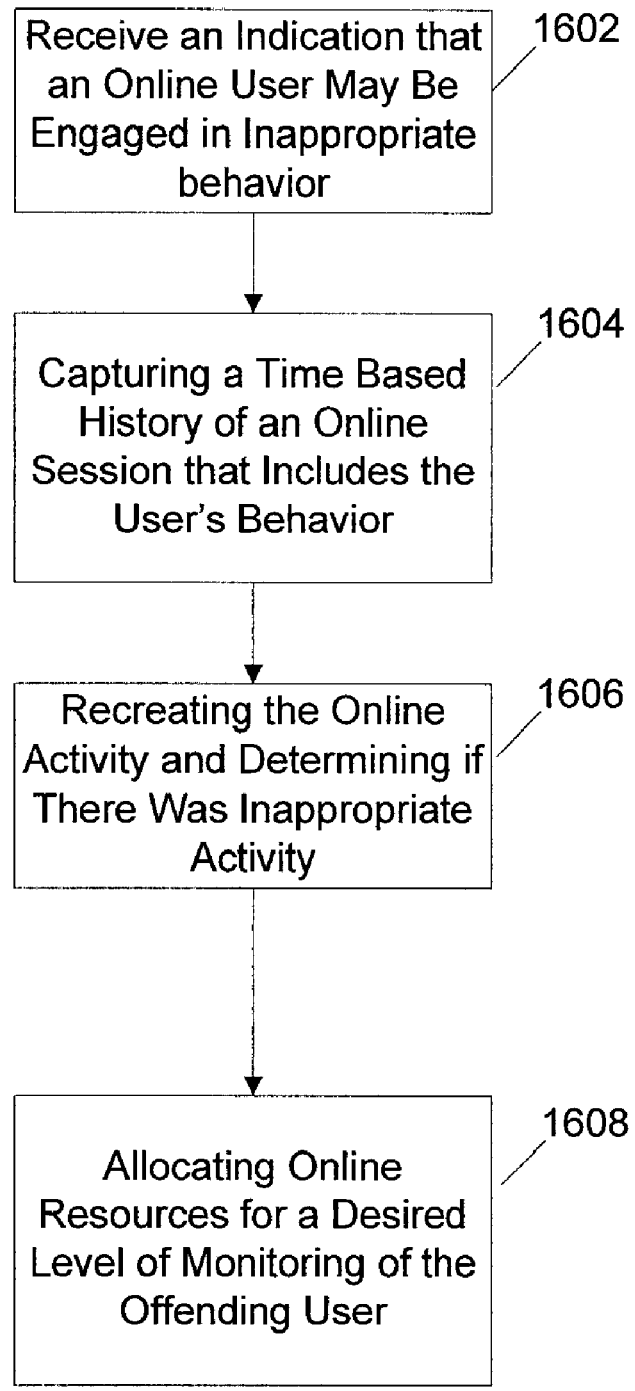
FIG. 16 is a flow chart illustrating aspects of network resource allocations.

FIG. 16 is a flow chart illustrating aspects of online or other network resource allocations. Flow begins in block 1602 where an indication that an online user may be engaging in inappropriate behavior is received. Flow then continues to block 1604 and a time based history of an online session that includes the user's behavior is captured. Flow continues to block 1606 where the online activities of the session are recreated. In block 1606 it is determined if there was inappropriate activity by an offending online user. Flow then continues to block 1608. In block 1608 online resources are allocated for a desired level of monitoring of the offending online user.

In one embodiment, capturing the time based history of the online session includes capturing online session activity that occurred a predetermined amount of time before receiving the indication that an online user may be engaging in inappropriate behavior. In another embodiment, capturing the time based history comprises associating online user identities with their online activity.

In one embodiment, allocating online resources for a desired level of monitoring of the offending member includes assigning online resources to track the activities of the offending member. In an embodiment, a network resource allocation entity that captures the time based history. In another embodiment, a moderation entity that captures the time based history, recreates the online activity, and communicates the desired level of monitoring of the offending user to a network resource allocation entity that allocates network resources. In still another embodiment the time based history is received from another network entity.

Figure 17:
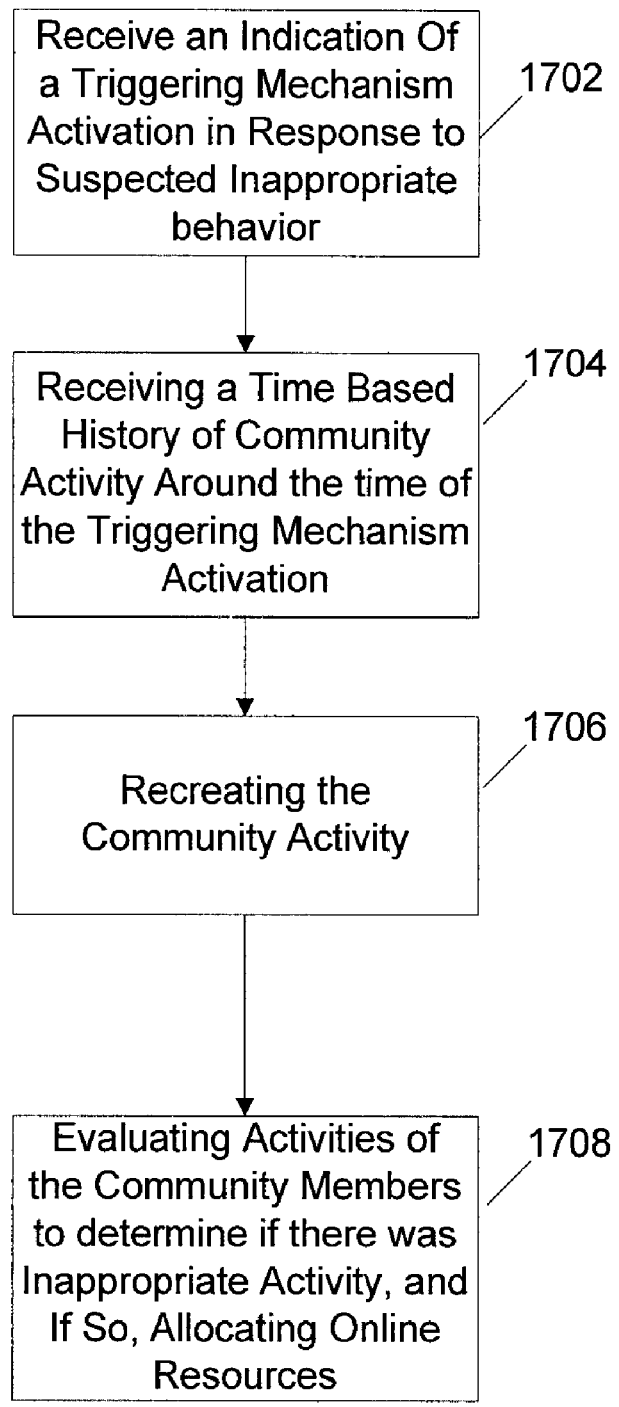
FIG. 17 is a flow chart illustrating additional aspects of network resource allocations.

FIG. 17 is a flow chart illustrating additional aspects of allocating online or other network resources. Flow begins in block 1702 an indication of a triggering mechanism being activated by an online community member is received indicating suspected inappropriate behavior by another online community member. Flow continues to block 1704 where a time based history of community members online activity is received. Flow continues to block 1706 where the community activity from the time based history is recreated. Flow continues to block 1708 where activities of the community members are evaluated to determine if there was inappropriate activity and if there is inappropriate activity by an offending community member online resources are allocated to monitor community members that have been identified as engaging in inappropriate behavior.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method of allocating online resources to monitor online community members that have been identified as engaging in inappropriate behavior, the method comprising:
receiving an indication that an online user may be engaging in inappropriate behavior,
wherein the indication is sent when another online user takes action to initiate storing a time based history of online community activity of the online user, the time based history covering a period that extends a desired duration before the taking of the action and a desired duration after the taking of the action;
capturing the time based history of an online session that includes the online user's online community activity;
recreating the online community activity and determining if there was inappropriate behavior by an offending online user according to standards currently being used to measure the inappropriate behavior;
allocating online resources for a desired level of monitoring of the offending online user; and
modifying the standards when a majority of online users indicates that a particular activity is inappropriate behavior even when the standards currently being used to measure the inappropriate behavior indicates that it is not.

2. The method of claim 1, wherein capturing the time based history comprises associating online user identities with their online community activity.

3. The method of claim 1, wherein allocating online resources for a desired level of monitoring of the offending online user comprises assigning online resources to track the activities of the offending online user.

4. The method of claim 1, further comprising a network resource allocation entity that captures the time based history.

5. The method of claim 1, further comprising a moderation entity that captures the time based history, recreates the online community activity, and communicates the desired level of monitoring of the offending user to a network resource allocation entity that allocates network resources.

6. A method of allocating online resources to monitor online community members that have been identified as engaging in inappropriate behavior, the method comprising:
receiving an indication of a triggering mechanism being activated by an online community member in response to suspected inappropriate behavior by another online community member,
wherein the indication is sent when the online community member takes action to initiate storing a time based history of online community activity of another online community member, the time based history covering a period that extends a desired duration before the taking of the action and a desired duration after the taking of the action;
receiving the time based history of online community activity of community members around a time of the triggering mechanism being activated;
recreating the online activity from the time based history; and
evaluating activities of the community members to determine if there was inappropriate behavior by an offending community member according to standards currently used to measure the inappropriate behavior and if there was inappropriate behavior, allocating online resources to monitor community members that have been identified as engaging in inappropriate behavior; and
modifying the standards when a majority of online community members indicates that a particular activity is inappropriate behavior even when the standards currently being used to measure the inappropriate behavior indicates that it is not.

7. An online community with online resources that are allocated to monitor members of the online community, the online community comprising:
at least two users that communicate in the online community, wherein a first user in the online community observes suspected inappropriate behavior by one or more other users in the online community, the first user takes action in response to the inappropriate behavior,
wherein the action is taken to initiate storing a time based history of online community activity, the time based history covering a period that extends a desired duration before the taking of the action and a desired duration after taking of the action;
a moderation entity that receives the time based history and recreates the online community activity to determine if there was inappropriate behavior by one of the users according to standards currently used to measure the inappropriate behavior, and if there was inappropriate behavior by one of the users, determining a desired level of monitoring to track an offending users' online community activity;

a network resource allocation entity that allocates online resources to track the activities of the offending user, the network resource allocation entity to modify the standards when a majority of the users of the online community indicates that a particular activity is inappropriate behavior even when the standards currently being used to measure the inappropriate behavior indicates that it is not.

8. A network entity comprising:

a network interface that receives an indication that an online user may be engaged in inappropriate behavior, wherein the indication is received when another online user takes action to initiate storing a time based history of online community activity of the online user, the time based history covering a period that extends a desired duration before the taking of the action and a desired duration after the taking of the action;

a processor that captures the time based history of online community activity of users in an online community when the indication is received, recreates the online community activity of the online community and determines if there was inappropriate behavior by one or more of the online users according to standards currently used to measure the measure the inappropriate behavior and if there was inappropriate behavior, allocates online resources to achieve a desired level of monitoring of an offending users, wherein the processor modifies the standards when a majority of the users of the online community indicates that a particular activity is inappropriate behavior even when the standards currently being used to measure the inappropriate behavior indicates that it is not.

9. The method of claim 1, wherein recreating the online community activity is done based from a plurality of data of the time based history, the plurality of data comprising text chat, audio chat, the state of all characters, their positions, and any other data associated with the time based history.

10. The method of claim 6, wherein recreating the online community activity is done based from a plurality of data of the time based history, the plurality of data comprising text chat, audio chat, the state of all characters, their positions, and any other data associated with the time based history.

11. The method of claim 7, wherein recreating the online community activity is done based from a plurality of data of the time based history, the plurality of data comprising text chat, audio chat, the state of all characters, their positions, and any other data associated with the time based history.

12. The method of claim 8, wherein recreating the online community is done based from a plurality of data from the time based history, the plurality of data comprising text chat, audio chat, the state of all characters, their positions, and any other data associated with the time based history.

\* \* \* \* \*